United States Patent
Itagaki et al.

(10) Patent No.: US 10,948,055 B2
(45) Date of Patent: Mar. 16, 2021

(54) PRESSING DEVICE FOR TOROIDAL CONTINUOUSLY VARIABLE TRANSMISSION

(71) Applicants: NSK LTD., Tokyo (JP); KAWASAKI JUKOGYO KABUSHIKI KAISHA, Hyogo (JP)

(72) Inventors: Hirofumi Itagaki, Fujisawa (JP); Masahiro Kita, Fujisawa (JP); Kippei Matsuda, Akashi (JP); Kenichiro Tanaka, Akashi (JP); Hideyuki Imai, Hyogo (JP); Kenji Komatsu, Hyogo (JP)

(73) Assignees: NSK LTD., Tokyo (JP); KAWASAKI JUKOGYO KABUSHIKI KAISHA, Hyogo (JP)

( * ) Notice: Subject to any disclaimer, the term of this patent is extended or adjusted under 35 U.S.C. 154(b) by 0 days.

(21) Appl. No.: 16/495,599

(22) PCT Filed: Mar. 20, 2018

(86) PCT No.: PCT/JP2018/011205
§ 371 (c)(1),
(2) Date: Sep. 19, 2019

(87) PCT Pub. No.: WO2018/174099
PCT Pub. Date: Sep. 27, 2018

(65) Prior Publication Data
US 2020/0011404 A1 Jan. 9, 2020

(30) Foreign Application Priority Data
Mar. 21, 2017 (JP) .............................. JP2017-054929

(51) Int. Cl.
*F16H 15/38* (2006.01)

(52) U.S. Cl.
CPC .................................. *F16H 15/38* (2013.01)

(58) Field of Classification Search
CPC .......... F16H 15/38; F16H 15/04; F16H 15/16; F16H 15/36
See application file for complete search history.

(56) References Cited

U.S. PATENT DOCUMENTS

| 718,110 A | 1/1903 | Eveland |
| 2,057,213 A | 10/1936 | Skyiepal |
| (Continued) | | |

FOREIGN PATENT DOCUMENTS

| JP | 01-299358 A | 12/1989 |
| JP | 10-331937 A | 12/1998 |
| (Continued) | | |

OTHER PUBLICATIONS

International Search Report and Written Opinion dated May 15, 2018, from International Application No. PCT/JP2018/011205, 7 sheets.

(Continued)

*Primary Examiner* — David M Fenstermacher
(74) *Attorney, Agent, or Firm* — Katten Muchin Rosenman LLP

(57) ABSTRACT

Provided is a pressing device for toroidal continuously variable transmission capable of reducing hysteresis that occurs between torque and pressing force. An intermediate sliding member 27 is provided in at least one location of a portion between an end surface on the outside in the radial direction of the retainer 13 of the roller 14 arranged on the outermost side in the radial direction and an inside surface of the pocket 25 on the outside in the radial direction, and a portion between an end surface on the outside in the radial direction of the retainer 13 of one roller 14 of adjoining rollers 14 in the radial direction and an end surface on the (Continued)

inside in the radial direction of the retainer 13 of another roller 14. As a result, the contact area of a sliding contact portion 32 is made smaller than in a case where an intermediate sliding member 27 is not provided.

9 Claims, 18 Drawing Sheets

(56) References Cited

U.S. PATENT DOCUMENTS

| | | | | |
|---|---|---|---|---|
| 5,368,529 | A * | 11/1994 | Machida | F16H 15/38 476/40 |
| 6,176,805 | B1 * | 1/2001 | Itoh | F16C 33/58 476/40 |
| 6,287,235 | B1 | 9/2001 | Yamamoto et al. | |
| 6,406,401 | B1 * | 6/2002 | Kuhn | F16H 15/38 476/42 |
| 2003/0130086 | A1 * | 7/2003 | Ishikawa | F16H 15/38 476/40 |
| 2003/0130087 | A1 * | 7/2003 | Imanishi | F16H 15/38 476/40 |
| 2013/0017925 | A1 * | 1/2013 | Burtt | F16H 61/6648 476/40 |
| 2013/0035200 | A1 * | 2/2013 | Noji | F16H 63/065 476/42 |
| 2013/0053211 | A1 * | 2/2013 | Fukuda | F16H 15/38 476/10 |
| 2013/0244827 | A1 * | 9/2013 | Katsumata | B64C 25/405 476/40 |
| 2016/0178036 | A1 * | 6/2016 | Kita | F16H 15/38 476/10 |
| 2017/0114876 | A1 * | 4/2017 | Fukuda | F16D 1/09 |
| 2019/0234496 | A1 * | 8/2019 | Nishimura | F16C 25/083 |
| 2020/0063837 | A1 * | 2/2020 | Itagaki | F16H 57/042 |

FOREIGN PATENT DOCUMENTS

| | | |
|---|---|---|
| JP | 11-201251 A | 7/1999 |
| JP | 11-270639 | 10/1999 |
| JP | 2001-65656 A | 3/2001 |
| JP | 2006-038131 A | 2/2006 |

OTHER PUBLICATIONS

The extended European search report dated Nov. 9, 2020, from European Patent Application No. 18771990.1, 8 sheets.

* cited by examiner

PRESSING DEVICE FOR TOROIDAL CONTINUOUSLY VARIABLE TRANSMISSION

TECHNICAL FIELD

The present invention relates to a loading cam type pressing device for a toroidal continuously variable transmission installed in generators such as aircraft generators and the like, various kinds of industrial machinery such as pumps and the like, and vehicles including automobiles, construction machinery and the like.

BACKGROUND ART

A toroidal continuously variable transmission comprises an input-side disk and an output-side disk that are coaxially arranged to each other and that rotate relative to each other, and a plurality of power rollers that are held between these disks, and the toroidal continuously variable transmission is configured so that power is transmitted from the input-side disk to the output-side disk via the power rollers. In a toroidal continuously variable transmission, it is possible to adjust the transmission ratio between the input-side disk and the output-side disk by changing the inclination angle of the power rollers.

During operation of a toroidal continuously variable transmission, an oil film of traction oil is formed on traction portions that are portions of rolling contact between a side surface in the axial direction of the input-side disk and a peripheral surface of the respective power rollers and between a side surface in the axial direction of the output-side disk and the peripheral surface of the respective power rollers. Power is transmitted from the input-side disk to the output-side disk via this oil film. In a toroidal continuously variable transmission, a pressing device is provided for pressing the input-side disk and the output-side disk in directions toward each other so that the transmission of power via the oil film of traction oil can be reliably performed.

As a pressing device for a toroidal continuously variable transmission, JP H11-201251(A) discloses a loading cam type pressing device for mechanically generating a pressing force that is proportional to the magnitude of the transmission torque. The loading cam type pressing device includes a first cam surface that is formed on the side surface in the axial direction of a disk-shaped cam plate, a second cam surface that is provided on the side surface in the axial direction of a disk that faces the first cam surface in the axial direction, and a plurality of rollers held between the first cam surface and the second cam surface. The plurality of rollers are rotatably held inside a plurality of rectangular-shaped pockets located at a plurality of locations in the circumferential direction of a retainer, with two or more rollers of the plurality of rollers being arranged in a row in the radial direction of the cam plate inside each of the pockets. The rollers are made of steel such as bearing steel or the like, and the retainer is made of steel such as carbonitriding steel.

During operation of a loading cam type pressing device, the rollers ride up on convex portions of the first cam surface and the second cam surface, whereby the space in the axial direction between the first cam surface and the second cam surface increases. As a result, the first disk on which the second cam surface is provided (for example, the input-side disk) is pressed toward the second disk (for example, the output-side disk) that faces the first disk, and the surface pressure of the traction portions is maintained.

In the loading cam type pressing device, it is desirable that the characteristics of the magnitude of the transmission torque and the generated pressing force have a linearity, or in other words, a proportional relationship. However, during operation of the toroidal continuously variable transmission, a centrifugal force acts on the roller as the retainer rotates, so a large frictional force is easily generated at the sliding contact portions between the end surfaces in the axial direction of the rollers, and at the sliding contact portions between the outside surfaces in the radial direction of the pockets and the end surfaces in the axial direction of the rollers that face the outside surfaces in the radial direction of the pockets. Therefore, as described in JP 2006-038131(A), hysteresis based on the frictional force is generated, so the relationship between the torque and the generated pressing force is no longer linear.

FIG. 17 illustrates an image of torque and generated pressing force. The solid lines in FIG. 17 shows the relationship between the torque and the generated pressing force when hysteresis occurs, the arrows X and Y attached along the line indicate the direction of change in torque and pressing force, and the line segments a indicated by a dash-dot line shows a theoretical relationship (theoretical value) between the torque and the pressing force, which corresponds to the target characteristic. As can be seen from FIG. 17, as indicated by the arrow X, when increasing the torque, a pressing force smaller than the theoretical value may be generated, whereas as indicated by the arrow Y, when reducing the torque, a pressing force larger than the theoretical value may be generated.

For this reason, when determining the dimensions of the loading cam type pressing device, it is necessary to consider the loss due to the hysteresis so that the required pressing force may always be ensured. More specifically, even when increasing the torque, in order to generate a pressing force that is equal to or larger than the theoretical value, it is necessary to determine the dimensions at which characteristics such as indicated by the dashed lines in FIG. 17 may be obtained. As a result, when reducing the torque, it is easy for a pressing force higher than the desired pressing force to be generated. When the generated pressing force of the pressing device becomes excessively large, not only does it become necessary to increase the dimensions and thus the weight of the pressing device, but also those of the overall toroidal continuously variable transmission in which the pressing device is installed. Therefore, with regard to a loading cam type pressing device, it is important to reduce the hysteresis in order to prevent excessive pressing while ensuring the necessary pressing force.

JP H01-299358(A) describes construction in which, as illustrated in FIG. 18, a contact portion 44 having a surface area that is much smaller than the surface area of the end surface of the roller 14 is formed in the center portion of one end surface of the roller 14 (upper end surface in FIG. 18) on the outside in the radial direction of the retainer 13, and this contact portion 44 is made to come in contact with the inside surface of the outside of the pocket 25 in the radial direction of the retainer 13, or is made to come in contact with the end surface of an adjacent roller 14 on the inside in the radial direction of the retainer 13. With this construction, the contact portion 44 has a surface area that is smaller than the surface area of the end surface of the roller 14, so it is possible to reduce the frictional force generated at the contact portion 44 due to the pressing force by a centrifugal force.

PRIOR ART DOCUMENTS

Patent Literature

Patent Literature 1: JP H11-201251(A)
Patent Literature 2: JP 2006-038131(A)
Patent Literature 3: JP H01-299358(A)

SUMMARY OF INVENTION

Technical Problem to be Solved by the Invention

However, in the construction of the rollers disclosed in JP H01-299358(A), it is not possible to sufficiently reduce the hysteresis generated between the torque and the pressing force in a loading cam type pressing device.

For example, in the construction disclosed in JP H01-299358(A), there is surface contact between a contact portion 44 of a roller 14 and the inside surface of the pocket 25 on the outside in the radial direction of the retainer 13, or between a contact portion 44 of a roller 14 and the end surface of an adjacent roller 14 on the inside in the radial direction of the retainer 13, so the hysteresis may not be sufficiently reduced.

In consideration of the situation described above, it is an object of the present invention to provide a pressing device for toroidal continuously variable transmission having construction capable of reducing hysteresis that occurs between the torque and pressing force.

Means for Solving the Problems

The pressing device for toroidal continuously variable transmission of the present invention includes a cam plate, a disk, a retainer, and a plurality of rollers.

The cam plate has a first cam surface that is uneven in a circumferential direction on one side in an axial direction.

The disk is one disk of an input-side disk and an output-side disk arranged to sandwich a power roller, and has a toroidal curved surface with an arc-shaped cross section on one side in the axial direction, and a second cam surface on the other side in the axial direction facing the first cam surface and that is uneven in the circumferential direction.

The retainer is arranged between the first cam surface and the second cam surface and has rectangular shaped pockets arranged at a plurality of locations in the circumferential direction so that a center axis of the respective pockets is arranged in a radial direction of the retainer.

The plurality of rollers are rotatably held inside the pockets with two or more rollers of the plurality of rollers being arranged in a row in the radial direction of the retainer inside the respective pockets. With the rollers being held inside the pockets, the rollers are arranged so that the center axis of the respective rollers is along the radial direction of the retainer and is substantially parallel to the center axis of the respective pockets.

In the pressing device of the present invention, an intermediate sliding member provided separately from the respective rollers is arranged coaxially with the center axis of the respective rollers in at least one location of a portion between an end surface on the outside in the radial direction of the retainer of one roller of the two or more rollers arranged in the respective pockets that is located on the outermost side in the radial direction of the retainer and an inside surface of the respective pockets that is on the outside in the radial direction of the retainer, and a portion between an end surface on the outside in the radial direction of the retainer of one roller of adjoining rollers in the radial direction of the retainer of the two or more rollers and an end surface on the inside in the radial direction of the retainer of the other roller of the adjoining rollers.

Sliding contact occurs between the intermediate sliding member and the inside surface of the respective pockets that is on the outside in the radial direction of the retainer, the end surface on the outside in the radial direction of the retainer of the one roller, the end surface on the inside in the radial direction of the retainer of the other roller, or a separate intermediate sliding member that is attached to these surfaces. A contact area of a sliding contact portion between the intermediate sliding member and these surfaces or the separate intermediate sliding member is smaller than a contact area of a sliding contact portion in a case where the intermediate sliding member is not provided and there is direct sliding contact between the end surface on the outside in the radial direction of the retainer of the one roller and the inside surface of the respective pockets that is on the outside in the radial direction of the retainer, or between the end surface on the outside in the radial direction of the retainer of the one roller of the adjoining rollers in the radial direction of the retainer and the end surface on the inside in the radial direction of the retainer of the other roller of the adjoining rollers.

The intermediate sliding member, as a separate body from the respective rollers, may be attached to one end surface of the respective rollers, or in other words, may be attached to the end surface on the outside in the radial direction of the retainer of either of the rollers. Alternatively, the intermediate sliding member, as a separate body from the respective rollers, may be attached to both end surfaces of the respective rollers, or in other words, may be attached to the end surface on the outside in the radial direction of the retainer of the respective rollers, and to the end surface on the inside in the radial direction of the retainer of the respective rollers. In this case, the intermediate sliding members come in sliding contact with each other between the adjoining rollers.

On the other hand, in a case where the intermediate sliding member is arranged in the portion between the end surface on the outside in the radial direction of the retainer of the one roller arranged on the outermost side in the radial direction of the retainer and the inside surface of the respective pockets that is on the outside in the radial direction of the retainer, instead of the intermediate sliding member being attached to the end surface on the outside in the radial direction of the retainer of the one roller, the intermediate sliding member may be attached to the inside surface of the respective pockets. In this case as well, the intermediate sliding member may be respectively attached to both the end surface on the outside in the radial direction of the retainer of the respective rollers and the inside surface of the respective pockets.

The intermediate sliding member may also be arranged in a portion between an end surface on the inside in the radial direction of the retainer of one roller of the two or more rollers that is arranged on the innermost side in the radial direction of the retainer and an inside surface of the respective pockets that is on the inside in the radial direction of the retainer. In this case as well, the intermediate sliding member may be attached to the end surface on the inside in the radial direction of the retainer of the roller and/or the inside surface on the inside in the radial direction of the retainer of the respective pockets.

As a preferred form, the intermediate sliding member is attached to the one end surface of all of these rollers, or in other words, to the end surface on the outside in the radial direction of the retainer of all the respective rollers, and the intermediate sliding members are coaxially arranged with the center axes of the rollers in all locations of the portion between the end surface on the outside in the radial direction of the retainer of the one roller of the two or more rollers arranged in the respective pockets that is located on the outermost side in the radial direction of the retainer and the inside surface on the outside in the radial direction of the retainer of the respective pockets, and the portion between the end surface on the outside in the radial direction of the retainer of the one roller of the adjoining rollers in the radial direction of retainer of the two or more rollers and the end surface on the inside in the radial direction of the retainer of the other roller of the adjoining rollers.

The shape of the intermediate sliding member is arbitrary as long as the contact area of the sliding contact portion when the intermediate sliding member is provided is sufficiently smaller than the contact area of the sliding contact portion when the intermediate sliding member is not provided. For example, a tip end surface of the intermediate sliding member that contacts the sliding contact portion may be is configured with a spherical convex surface or a conical convex surface. Alternatively, the tip end surface of the intermediate sliding member may be configured with a circular flat surface having a smaller diameter than the end surface of the roller.

Alternatively, the intermediate sliding member may be configured by a ball (sphere) that is arranged in the at least one location of the portion between the end surface on the outside in the radial direction of the retainer of the one roller of the two or more rollers arranged in the respective pockets that is located on the outermost side in the radial direction of the retainer and the inside surface of the respective pockets that is on the outside in the radial direction of the retainer, and the portion between the end surface on the outside in the radial direction of the retainer of the one roller of the adjoining rollers in the radial direction of the retainer of the two or more rollers, and the end surface on the inside in the radial direction of the retainer of the other roller. In this case, a partial spherical or conical concave portion (concave surface) may be provided in a portion of each of the end surfaces of the rollers and/or the inside surfaces of the respective pockets of the retainer that comes in sliding contact with the intermediate sliding member.

At least the end surface on the outside in the radial direction of the retainer of the respective rollers of the pressing device for toroidal continuously variable transmission according to the present invention, preferably, has an R portion that connects the end surface with a rolling surface of the respective rollers, and an attaching portion provided in a center portion in the radial direction of the end surface for attaching the intermediate sliding member, in which an outermost surface in the radial direction of the retainer of the end surface is constructed by a flat surface that extends in a direction orthogonal to the center axis of the respective rollers.

The attaching portion may be configured by a concave portion that is provided the end surface, and the end surface corresponds to the outermost surface.

The attaching portion may be configured by a convex portion provided on the end surface, and the outermost surface is constructed by a tip end surface of the convex portion.

In the pressing device for toroidal continuously variable transmission of the present invention, the hardness of the material of the intermediate sliding member is lower than the hardness of the material of the respective rollers. In a case where the respective rollers are made of bearing steel, the intermediate sliding member may be made of brass, aluminum or the like.

Effect of the Invention

With the pressing device for toroidal continuously variable transmission of the present invention, it is possible to reduce hysteresis that occurs between torque and a pressing force. That is to say, the intermediate sliding member that is separate from the roller is arranged in at least one location of a portion between the end surface on the outside in the radial direction of the retainer of the roller arranged on the outermost side in the radial direction of the retainer and the inside surface of the pocket on the outside in the radial direction of the retainer, and a portion between the end surface on the outside in the radial direction of the retainer of one roller of the adjoining rollers in the radial direction of the retainer of the two or more rollers and the end surface on the inside in the radial direction of the retainer or the other roller of the adjoining rollers, and therefore the contact area of the sliding contact portion between the intermediate sliding member and the inside surface of the respective pockets or the end surface of the roller is made smaller than the contact area of the sliding contact portion in a case where the intermediate sliding member is not provided and there is direct sliding contact between the end surface of the roller and the inside surface of the pocket, or between the end surfaces in the axial direction of the adjoining rollers in the radial direction of the retainer. As a result, frictional torque that occurs at the sliding contact portion between the intermediate sliding member and the end surface in the axial direction of the roller or the side surface in the radial direction of the pocket may be made smaller than in the case where the intermediate sliding member is not provided. Accordingly, with the pressing device for toroidal continuously variable transmission of the present invention, it is possible to reduce hysteresis that occurs between torque and a pressing force.

Particularly, in the pressing device for toroidal continuously variable transmission of the present invention, the intermediate sliding member is formed separately from the roller, so the design of the intermediate sliding member is not restricted by the roller body. Therefore, in a case where the tip end surface of the intermediate sliding member is configured by a spherical convex surface, it becomes possible to reduce the radius of curvature of the spherical convex surface, and compared with a case where the spherical convex surface is directly formed on the end surface as in a conventional roller, the contact area of the sliding contact portion can be reduced, the sliding contact portion can be configured by point contact, and the hysteresis can be more effectively reduced.

Moreover, by making the intermediate sliding member separate, it is possible for the material of the intermediate sliding member to be different than the material of the roller. Therefore, the hardness of the material of the intermediate sliding member can be made lower than the hardness of the material of the roller, so in comparison with a case where there is sliding contact between end surfaces of rollers made of bearing steel, the frictional force can be effectively reduced, and thus, the hysteresis can be effectively reduced.

Furthermore, by making the intermediate sliding member a separate member, even when a structure for attaching the intermediate sliding member is provided on an end surface on the outside in the radial direction of the retainer of the roller, the outermost surface in the radial direction of the retainer of this end surface is configured by a flat surface that extends in a direction orthogonal to the center axis of the roller, or in other words, this end surface may be made parallel to the opposing end surface of the roller which is adjacent thereto. Therefore, even in a case where grinding is performed on the rolling surfaces of a plurality of rollers at the same time, the plurality of rollers can be stably placed, and the rolling surface of the respective rollers may be made to have favorable processing accuracy. This also makes it possible to reduce the loss due to hysteresis that accompanies a local increase in contact pressure on the rolling surface.

MODES FOR CARRYING OUT THE INVENTION

First Example

Figure 1:
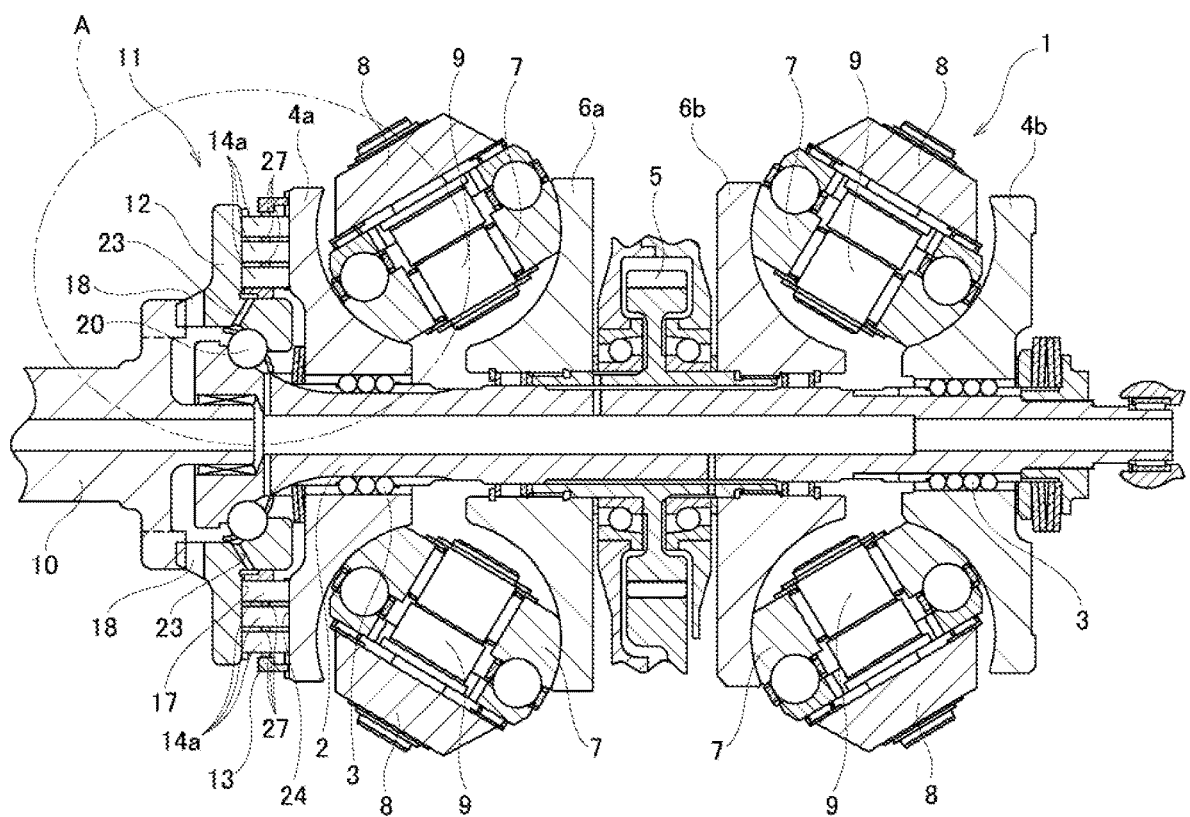
FIG. 1 is a cross-sectional view of a toroidal continuously variable transmission according to a first example of the embodiment of the present invention.
Figure 2:
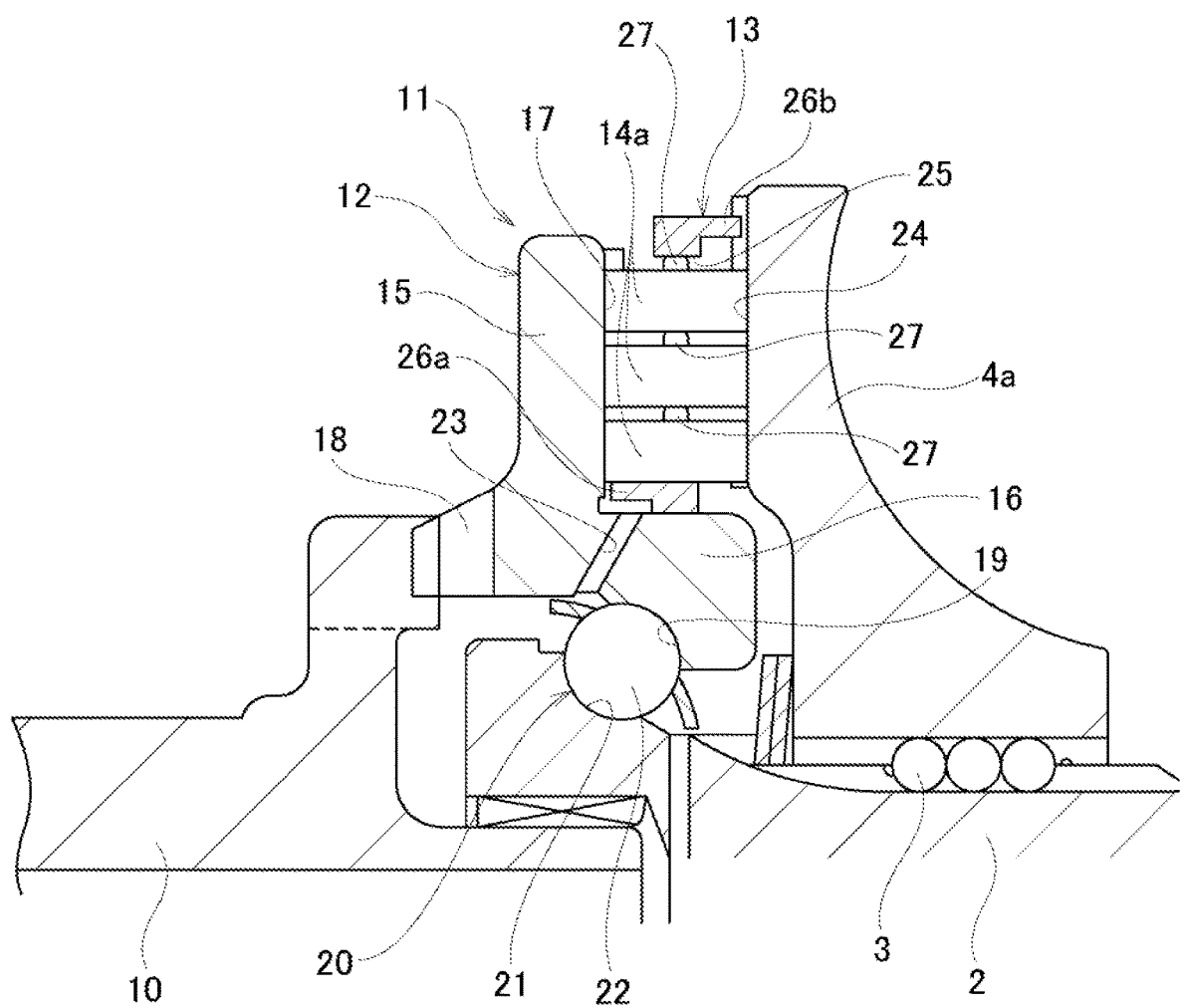
FIG. 2 is an enlarged view of portion A in FIG. 1.
Figure 3:
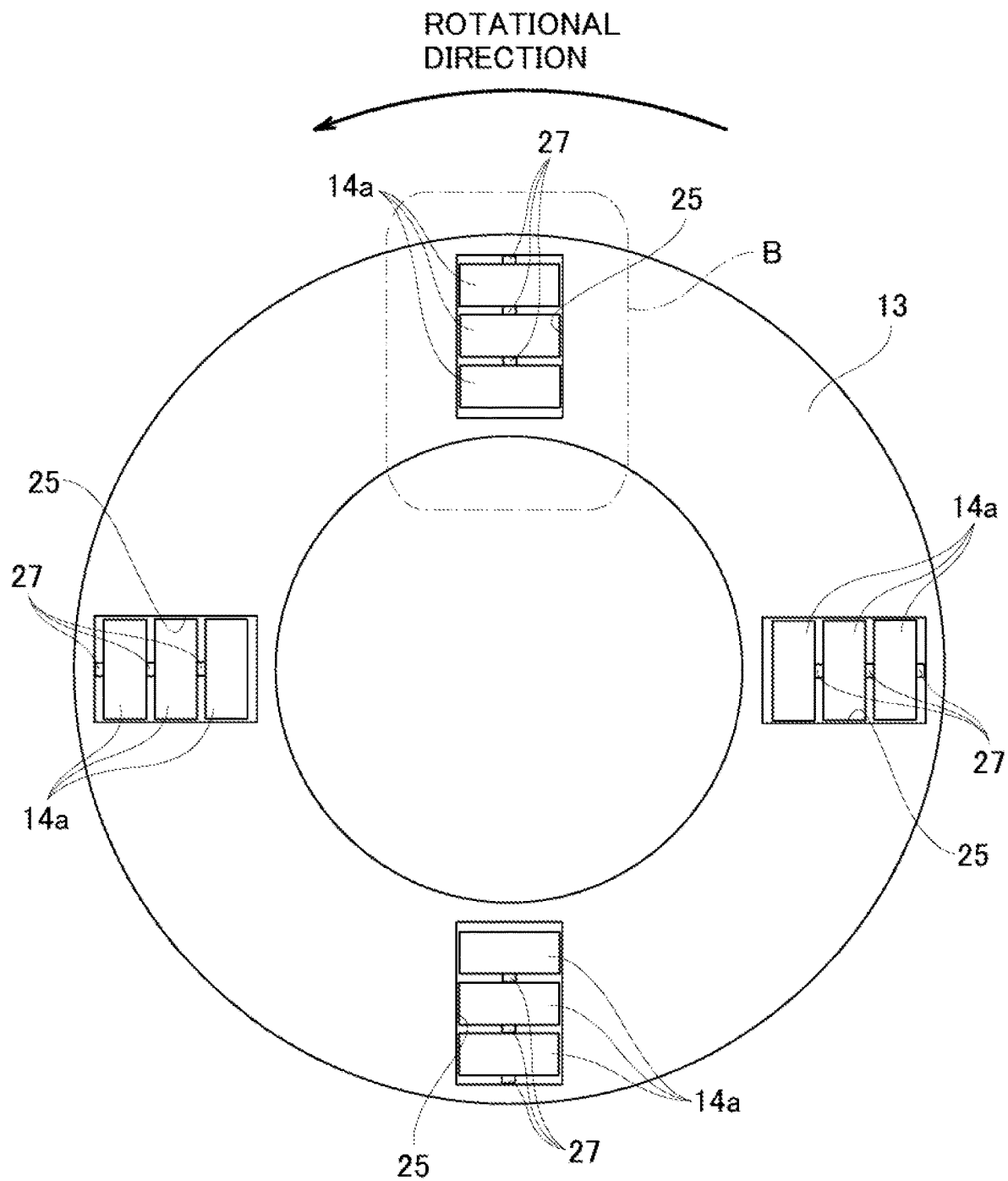
FIG. 3 is a schematic view of the removed retainer and the rollers of the toroidal continuously variable transmission according to the first example of an embodiment of the present invention, as viewed from the axial direction of the retainer.
Figure 4:
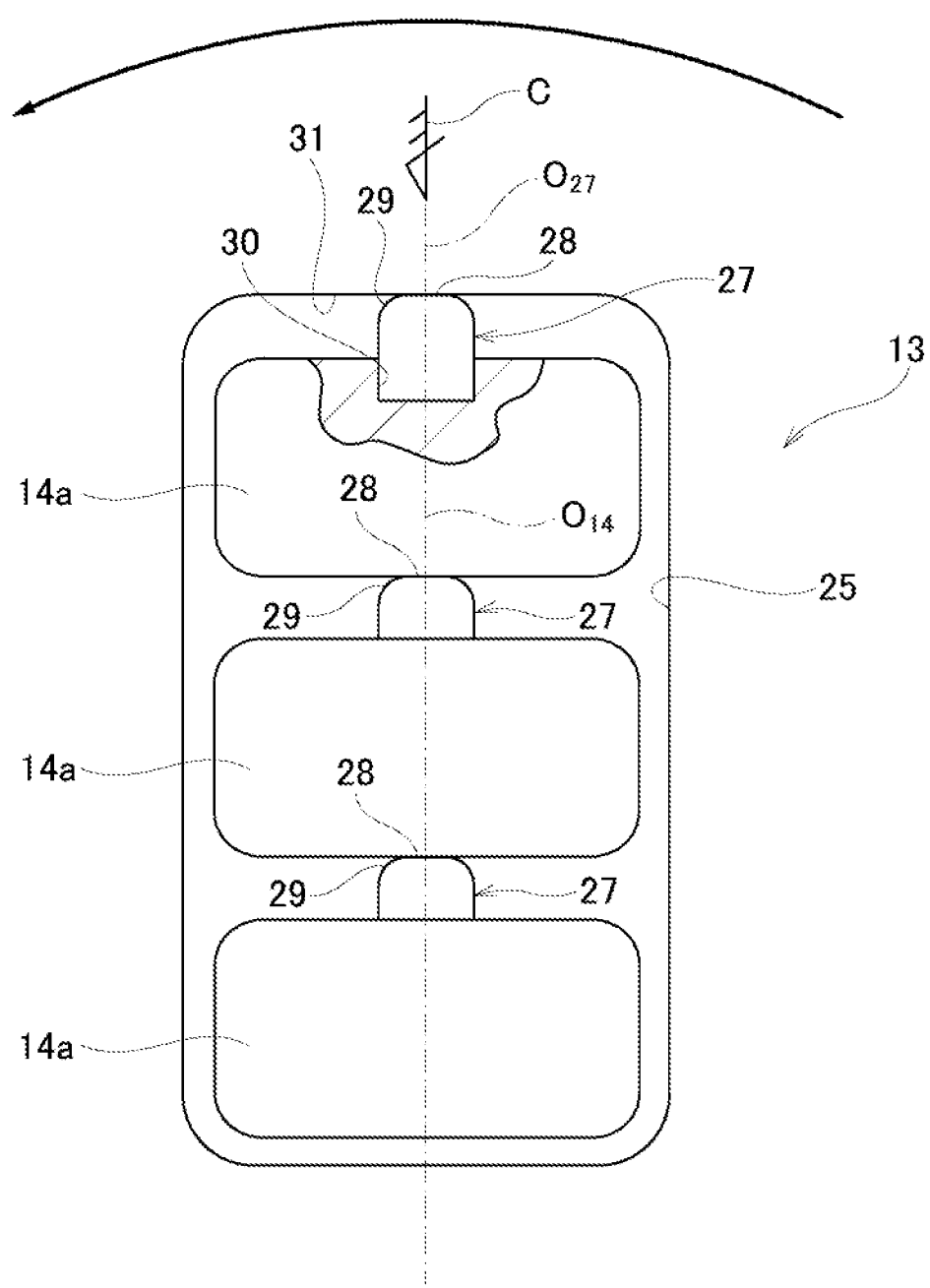
FIG. 4 is a partial cross-sectional enlarged view of a portion corresponding to a portion B in FIG. 3.

FIG. 1 to FIG. 6 illustrate a first example of an embodiment of the present invention. The toroidal continuously variable transmission 1 is a double cavity type and includes a pair of outside disks 4a, 4b and inside disks 6a, 6b, between which two cavities are formed in which power rollers 7 are arranged. The pair of outside disks 4a, 4b are supported around both end portions in the axial direction of the input shaft 2 via ball splines 3 so as to be able to rotate coaxially and synchronously with each other. The outside disks 4a and 4b have toroidal curved surfaces that are concave surfaces having an arc-shaped cross section on the inside in the axial direction facing each other. However, the present invention can also be applied to pressing device for a single-cavity toroidal continuously variable transmission that includes one input-side disk and one output-side disk.

A gear 5 is supported around a middle portion in the axial direction of the input shaft 2 so as to be able to rotate relative to the input shaft 2. At both end portions of a cylindrical portion provided at the center portion of the gear 5, the inside disks 6a, 6b are supported by spline engagements so as to be able to rotate in synchronization with the gear 5. The inside disks 6a, 6b have toroidal curved surfaces that are concave having an arc-shaped cross section on the outside surface in the axial direction facing the outside disks 4a, 4b in the axial direction.

A plurality of power rollers 7 are respectively held between the toroidal curved surfaces on the inside in the axial direction of the outside disks 4a, 4b and the toroidal curved surfaces on the outside in the axial direction of the inside disks 6a, 6b. Each of the power rollers 7 is rotatably supported on the inside surface of a trunnion 8 via a support shaft 9 and a plurality of rolling bearings. The trunnions 8 are each capable of pivotal displacement about pivots (not illustrated) provided at both end portions in the longitudinal direction (front and back direction in FIG. 1). The operation of causing the trunnion 8 to pivot is performed by causing the trunnion 8 to be displaced in the axial direction of the pivot by an actuator (not illustrated).

During operation of the toroidal continuously variable transmission 1, the input shaft 2 is rotated and driven by the drive shaft 10 connected to the power source by rotating and driving the outside disk 4a (left side in FIG. 1) of the outside disks 4a, 4b via the loading cam type pressing device 11. In this example, the pair of outside disks 4a, 4b correspond to the input-side disks that input power, and the inside disks 6a, 6b correspond to the output-side disks that output power. However, the present invention may also be applied to construction in which the inside disks 6a, 6b are input-side disks and the pair of outside disks 4a, 4b are output-side disks.

The pressing device 11 includes a cam plate 12, the outside disk 4a of the pair of outside disks 4a, 4b, a retainer 13 and a plurality of rollers 14a.

The cam plate 12 is configured so as to have a crank shape cross section and an overall annular shape, and is supported around the base end portion (the left end portion in FIG. 1) of the input shaft 2. The cam plate 12 includes an annular portion 15 provided on the outside portion in the radial direction and a cylindrical portion 16 provided on the inside portion in the radial direction. The annular portion 15 has a drive-side cam surface 17 on one side in the axial direction, or in other words the inside in the axial direction (right-side surface in FIG. 1 and FIG. 2), where this drive-side cam surface 17 is uneven in the circumferential direction and corresponds to a first cam surface; and has a plurality of protruding pieces 18 on the other side in the axial direction, or in other words, on the inside portion in the radial direction of the outside in the axial direction (left-side surface in FIG. 1 and FIG. 2), where these protruding pieces protrude in the axial direction. The protruding pieces 18 are engaged with the tip end portion of the drive shaft 10 to enable the rotation of the drive shaft 10 to be transmitted to the cam plate 12.

The cylindrical portion 16 has an angular type outer-ring raceway 19 on the inner circumferential surface. An angular type ball bearing 20 is configured by the outer-ring raceway 19, an angular type inner-ring raceway 21 formed on the outer circumferential surface of the base end portion of the input shaft 2, and a plurality of balls 22 rotatably arranged between the outer-ring raceway 19 and the inner-ring raceway 21. The cam plate 12 is rotatably supported at the base end portion of the input shaft 2 by the angular ball bearing 20, and a thrust load acting on the cam plate 12 can be supported by the input shaft 2. The cylindrical portion 16 has oil holes 23 at a plurality of locations in the circumferential direction, and these oil holes 23 penetrate through in the radial direction, allowing lubrication oil (traction oil) to pass through. The oil holes 23 may be provided, for example, at four locations at equal intervals in the circumferential direction of the cylindrical portion 16. The oil holes 23 supply lubrication oil that is supplied to the ball bearing 20 through the inner portion of the input shaft 2 to the inner-diameter side of the retainer 13.

The outside disk 4a is supported around a portion near the base end of the input shaft 2 via a ball spline 3 so as to be able to rotate in synchronization with the input shaft 2, and so as to be able to be displaced in the axial direction with respect to the input shaft 2. The outside disk 4a, as described above, has the toroidal curved surface on the inside in the axial direction that is one side in the axial direction, and has a driven-side cam surface 24 on the other side in the axial direction, or in other words, on the outside in the axial direction (left-side in FIG. 1 and FIG. 2) facing the drive-side cam surface 17, where this driven-side cam surface 24 corresponds to the second cam surface, and is uneven in the circumferential direction.

The retainer 13 is made of a steel material such as carbonitriding steel or the like, and has an overall annular plate shape, and is arranged between the drive-side cam surface 17 and the driven-side cam surface 24. The retainer 13 has pockets 25 at four locations at equal intervals in the circumferential direction of the middle portion in the radial direction, where the center axis of each of these pockets 25 is along the radial direction of the retainer 13, and the shape of the opening as seen from the axial direction is rectangular. However, the number of pockets 25 is arbitrary, and the pockets 25 may be provided at two or more locations in the circumferential direction of the retainer 13. Preferably, the pockets 25 are provided at three to five locations at equal intervals in the circumferential direction of the middle portion in the radial direction of the retainer 13.

The retainer 13 has protruding portions 26a, 26b on the inner circumferential edge portion and outer circumferential edge portion and that protrude in opposite directions from each other in the axial direction. By engaging the protruding portion 26a with the drive-side cam surface 17 and engaging the protruding portion 26b with the driven-side cam surface 24, the retainer 13 is positioned in the axial direction. The inner circumferential surface of the retainer 13 closely faces the outer circumferential surface of the cylindrical portion 16 of the cam plate 12, or in other words, the inner circumferential surface of the retainer 13 is fitted around the outer circumferential surface of the cylindrical portion 16 with a clearance fit, and thus the retainer 13 can be positioned in the radial direction of the retainer 13.

The plurality of rollers 14a are made of steel such as bearing steel or the like, and each of the rollers 14a has a short cylindrical shape the axial dimension of which is short compared to the diameter dimension, and has a cylindrical surface shaped rolling surface that is the outer circumferential surface, and flat surface shaped end surfaces on both sides in the axial direction. A crowning process is performed on the rolling surface of the respective rollers 14a. In this example, the rollers 14a are rotatably held inside the pockets 25 that are formed at a plurality of locations in the circumferential direction of the retainer 13 with three rollers 14a arranged in a row in the radial direction of the retainer 13 inside the respective pockets so that the respective central axes of these rollers coincide with each other. The center axes of the rollers 14a arranged inside the respective pockets 25 are along the radial direction of the retainer 13 and are substantially parallel to and preferably substantially coincide with the center axis of the respective pockets 25. The rolling surface of the respective rollers 14a held by the retainer 13 comes in rolling contact with the drive side cam surface 17 and the driven side cam surface 24, and in this state, the respective rollers 14a are held between the drive-side cam surface 17 and the driven-side cam surface 24.

However, the number of rollers 14a arranged in each pocket 25 is arbitrary, and two or more, and preferably two to four rollers 14a may be arranged in a row in the radial direction of the retainer 13 inside each pocket 25. By providing two or more rollers 14a inside each of the pockets 25 as in this example, these rollers 14a may be independently rotated, so it becomes possible to absorb the speed difference between the inner diameter side and the outer diameter side of the drive side cam surface 17 and the driven side cam surface 24.

In this example, an intermediate sliding member 27 that is separate from the respective rollers 14a is attached to an end surface in the axial direction that is on the outside in the radial direction of the retainer 13 (upper end surface in FIG. 4) of both end surfaces in the axial direction of the respective rollers 14a. The intermediate sliding members 27 has an overall cylindrical shape, and has a diameter that is smaller than that of the respective rollers 14a. The intermediate sliding member 27 has a flat surface shaped, circular sliding contact surface 28 on the center portion of one end surface in the axial direction (upper end surface in FIG. 4) and existing on a virtual plane orthogonal to the central axis $O_{27}$, and has a chamfered portion 29 having a circular arc shaped cross section on the outer circumferential edge portion of the one end surface in the axial direction (outside in the radial direction of the sliding contact surface 28).

The outer diameter of the intermediate sliding member 27 and the diameter of the sliding contact surface 28 are determined taking into consideration that plastic deformation due to surface pressure acting on the inside surface 31 on the outside in the radial direction of the respective pockets 25 and the other end surface in the axial direction (lower end surface in FIG. 4) of the respective rollers 14a that come in sliding contact with the sliding contact surface 28 does not occur on the inside surface 31 on the outside in the radial direction and the other end surface in the axial direction of the roller 14a. The intermediate sliding member 27, similar to the roller 14a, can be made of a steel material such as bearing steel or the like, however, since a large load is not applied compared to the roller 14a, preferably the intermediate sliding member 27 may be made of a material having rigidity lower than that of the roller 14a, such as aluminum or brass. Moreover, compared to the rolling surface of the roller 14a, a large load is not applied to the sliding contact surface 28 of the intermediate sliding member 27, so the surface roughness of the sliding contact surface 28 may also be larger than the surface roughness of the rolling surface of the roller 14a. As a result, material having different properties come into contact with each other between the rollers 14a, so compared with a case where a conventional contact portion is integrally formed with the roller and materials having the same properties come in contact each other between the rollers 14, the frictional force is reduced, and effect of reduced hysteresis is obtained.

In this example, a concave portion 30 having a diameter smaller than the diameter of the intermediate sliding member 27 is provided in the center portion of one end surface in the axial direction of the respective rollers 14a that is arranged on the outside in the radial direction of the retainer 13a. The intermediate sliding member 27 is attached to the respective rollers 14a by inserting the other end in the axial direction (lower end portion in FIG. 4) thereof inside the concave portion 30 that is opened at the center portion of the one end surface in the axial direction of the respective rollers 14a. With the intermediate sliding member 27 in a state of being attached to the respective rollers 14a, one end portion in the axial direction of the intermediate sliding member 27 protrudes from the one end surface in the axial direction of the respective rollers 14a, and the center axis $O_{27}$ of the intermediate sliding member 27 and the center axis $O_{14}$ of the respective rollers 14a substantially coincide. In order to attach the intermediate sliding member 27 to the respective rollers 14a, the other end portion in the axial direction of the intermediate sliding member 27 can be fixed to the concave portion 30 by press fitting, screwing, bonding, welding or the like.

The rollers 14a to which the intermediate sliding member 27 is respectively attached are combined so that two or more, three in the example in the figures, are arranged in a row in the radial direction of the retainer 13, with the center axes thereof coinciding with each other, and are rotatably held inside each of the pockets 25. As a result, the intermediate sliding members 27 are arranged in portions between mutually facing end surfaces in the axial direction of adjoining rollers 14a in the radial direction of the retainer 13, and in a portion between the inside surface 31 of the respective pockets 25 that is on the outside in the radial direction that faces toward the inside in the radial direction of the retainer 13 and one end surface in the axial direction of one roller 14a of the rollers 14a arranged inside the respective pockets 25 that is located on the outermost side in the radial direction of the retainer 13. The one end surface in the axial direction of the intermediate sliding member 27 that is fixed to the roller 14a that is located on the outermost side in the radial direction of the retainer 13 is made to face the inside surface 31 on the outside in the radial direction of the respective pockets 25. The one end surface in the axial direction of an intermediate sliding member 27 that is fixed to a roller 14a other than the roller 14a that is arranged on the outermost side is made to face the other end surface of another roller 14a that is arranged adjacent on the outside in the radial direction of the retainer 13 with respect to this roller 14a.

In this example, by using a roller 14a to which an intermediate sliding member 27 is attached for all of the plurality of rollers, the intermediate sliding member 27 of the roller 14a is arranged in all locations of the portions between the end surfaces in the axial direction of the adjoining rollers 14a in the radial direction of the retainer 13, and in the portion between the inside surface 31 the pocket 25 that is on the outside in the radial direction that faces toward the inside in the radial direction of the retainer 13 and one end surface in the axial direction of the one roller 14a of the rollers 14a that are arranged inside the pocket 25 that is located on the outermost side in the radial direction of the retainer 13 for each pocket 25. However, the present invention also includes construction in which at least one roller 14a having an intermediate sliding member 27 is provided for each pocket 25. Particularly, it is important that a roller 14a be provided so that the intermediate sliding member 27 is located between the inside surface 31 on the outside in the radial direction of the pocket 25 and the one end surface in the axial direction of the roller 14a that is located on the outside in the radial direction of the retainer 13, the roller 14a being arranged on the outermost side in the radial direction of the retainer 13, and in doing so, the frictional torque may be effectively reduced. In other words, the sliding resistance that occurs at the sliding contact portion between the inside surface 31 of the pocket 25 and the end surface of the roller 14a that is located on the outermost side in the radial direction of the retainer 13 becomes larger than the sliding resistance that occurs at the sliding contact portion between the end surfaces in the axial direction of the adjoining rollers 14a.

The reason for this is that, first, the amount of relative displacement (amount of movement) between the inside surface 31 of the pocket 25 and the end surface in the axial direction of the roller 14a that is located on the outermost side becomes larger in comparison with the amount of relative displacement of the end surfaces in the axial direction of the adjoining rollers 14a. Second, the centrifugal force acting on the rollers 14a other than the roller 14a that is located on the outermost side in the radial direction of the retainer 13 is added to the normal force acting on the sliding contact portion between the inside surface 31 of the pocket 25 and the end surface in the axial direction of the roller 14a that is located on the outermost side, so the normal force becomes larger at the sliding contact portion therebetween than the normal force at the other sliding contact portions.

In this way, by arranging an intermediate sliding member 27 between the inside surface 31 of the pocket 25 and the end surface in the axial direction of the roller 14a that is arranged on the outermost side in the radial direction of the retainer 13 of the rollers 14a that are held inside the pocket 25, the sliding resistance that occurs at the sliding contact portion between the inside surface 31 of the pocket 25 and the end surface in the axial direction of the roller 14a that is located on the outermost side may be sufficiently reduced, and thus the frictional torque may be effectively reduced. Furthermore, the occurrence of fretting wear at that sliding contact portion may be prevented.

Therefore, in the present invention, the one roller 14a having the intermediate sliding member 27 is provided on the outermost side in the radial direction of the retainer 13 inside the respective pockets 25 such that the intermediate sliding member 27 is arranged in the portion between the inside surface 31 of the respective pockets 25 that is on the outside in the radial direction of the retainer 13 and one end surface in the axial direction of the one roller 14a, and conventional rollers may be used for the remaining rollers. The one roller 14a having the intermediate sliding member 27 can be provided such that the intermediate member 27 is arranged in only one portion between the end surfaces in the axial directions of adjoining rollers 14a in the radial direction of the retainer 13, and even in this case, the effect of reducing the frictional torque may be obtained for that amount.

Figure 5:
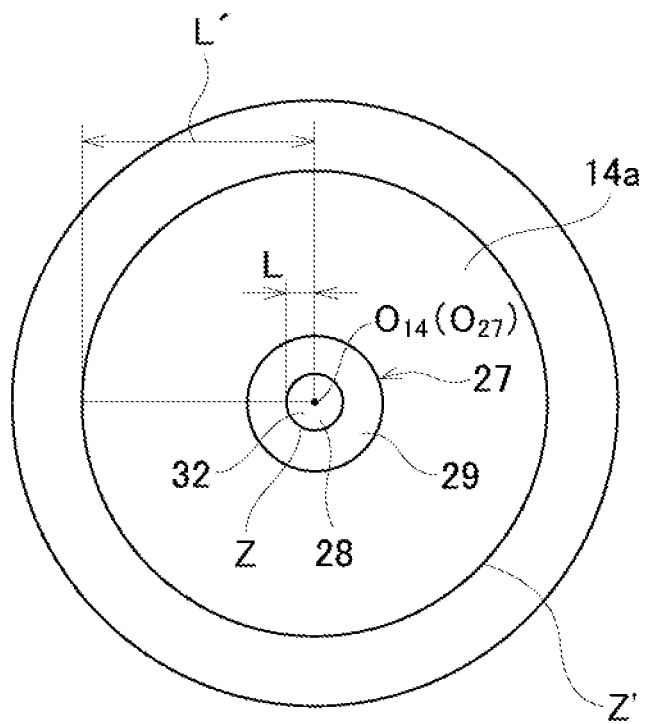
FIG. 5 is a schematic view as seen from the direction of arrow C in FIG. 4.

During operation of the toroidal continuously variable transmission 1, when a centrifugal force acts on the rollers 14a as the retainer 13 rotates, the sliding contact surface 28 of the one end surface in the axial direction of the respective intermediate sliding members 27 respectively comes in contact with the inside surface 31 on the outside in the radial direction of the respective pockets 25 and the other end surfaces in the axial direction of the rollers 14a on the outside in the radial direction and in the middle in radial direction. As illustrated in FIG. 5, the shape of the sliding contact portions 32 between the sliding contact surface 28 and the inside surface 31 on the outside in the radial direction and between the sliding contact surface 28 and the other end surface in the axial direction of the roller 14a is circular having a diameter equal to that of the sliding contact surface 28. In this example, the rolling surface of the respective rollers 14a is held between the drive side cam surface 17 and the driven side cam surface 24, while the outer circumferential surface of the respective intermediate sliding members 27 is in a state of being separated from the drive side cam surface 17 and the driven cam surface 24.

In a state in which the rollers 14a and the intermediate sliding members 27 are assembled inside the respective pockets 25, the center axis of the respective pockets 25, the center axes $O_{14}$ of the rollers 14a and the center axes $O_{27}$ of the intermediate sliding members 27 substantially coincide. In this example, the rollers 14a each roll independently, so it is possible to absorb the speed difference between the inner diameter side and the outer diameter side of the drive-side cam surface 17 and the driven-side cam surface 24.

During operation of the toroidal continuously variable transmission 1, the drive shaft 10 rotates and drives the cam plate 12, whereby the rollers 14a are strongly held between the drive-side cam surface 17 and the driven-side cam surface 24, and the rotation of the cam plate 12 is transmitted to the outside disk 4a via the rollers 14. As a result, the pair of outside disks 4a, 4b that are supported by both end portions in the axial direction of the input shaft 2 rotate in synchronization while being pressed in a direction toward each other, and furthermore, the rotation of the outside disks 4a, 4b is transmitted to the inside disks 6a, 6b via the power rollers 7, and output from the gear 5.

In the pressing device 11 of this example, it is possible to reduce the hysteresis that occurs between the transmitted torque and the generated pressing force. In other words, in the present example, the intermediate sliding members 27 are respectively attached to one end surface in the axial direction of the respective rollers 14a, and the sliding contact surfaces 28 respectively provided on one end surface in the axial direction of the respective intermediate sliding members 27 and having a diameter smaller than that of the one end surface in the axial direction of the respective rollers 14a are made to come in sliding contact with the inside surface 31 on the outside in the radial direction of the respective pockets 25, and the other end surfaces in the axial direction of the rollers 14a arranged on the outside in the radial direction and the middle in the radial direction inside the respective pockets 25. Therefore, the contact area of the sliding contact portions 32 between the sliding contact surface 28 and the inside surface 31 on the outside in the radial direction of the respective pockets 25 and between the sliding contact surface 28 and the other end surfaces in the axial direction of the rollers 14a can be made to be smaller than the contact area of contact portions in a case where intermediate sliding members 27 are not provided and there is direct sliding contact between the inside surface 31 on the outside in the radial direction of the respective pockets 25 and the one end surface in the axial direction of the roller arranged on the outermost side, and in a case of direct sliding contact between end surfaces in the axial direction of adjoining rollers in the radial direction of the retainer 13 inside the respective pockets.

As a result, the distance L from the center of rotation $O_{14}$ of the roller 14a to the outer circumferential edge Z (the portion farthest from the center of rotation $O_{14}$ among the portions where frictional force is applied) of the sliding contact portion 32 can be made to be shorter than the distance L' from the center of rotation $O_{14}$ of the roller 14a to the outer circumferential edge Z' of the sliding contact portion in the case where an intermediate sliding member 27 is not provided. Therefore, the frictional torque generated at the sliding contact portion 32 can be reduced in comparison with a case where the intermediate sliding member 27 is not provided. As a result, the hysteresis that occurs between the transmitted torque and the generated pressing force can be reduced, and the relationship between the torque and the pressing force can be made close to linear (proportional).

Particularly, in the present example, the intermediate sliding member 27 is arranged at a portion between the outside surface in the radial direction of the respective pockets 25 and one end surface in the axial direction of the roller 14a that is arranged on the outermost side where the sliding resistance tends to increase, the frictional torque that occurs at the sliding contact portion 32 can be effectively reduced.

Figure 6:
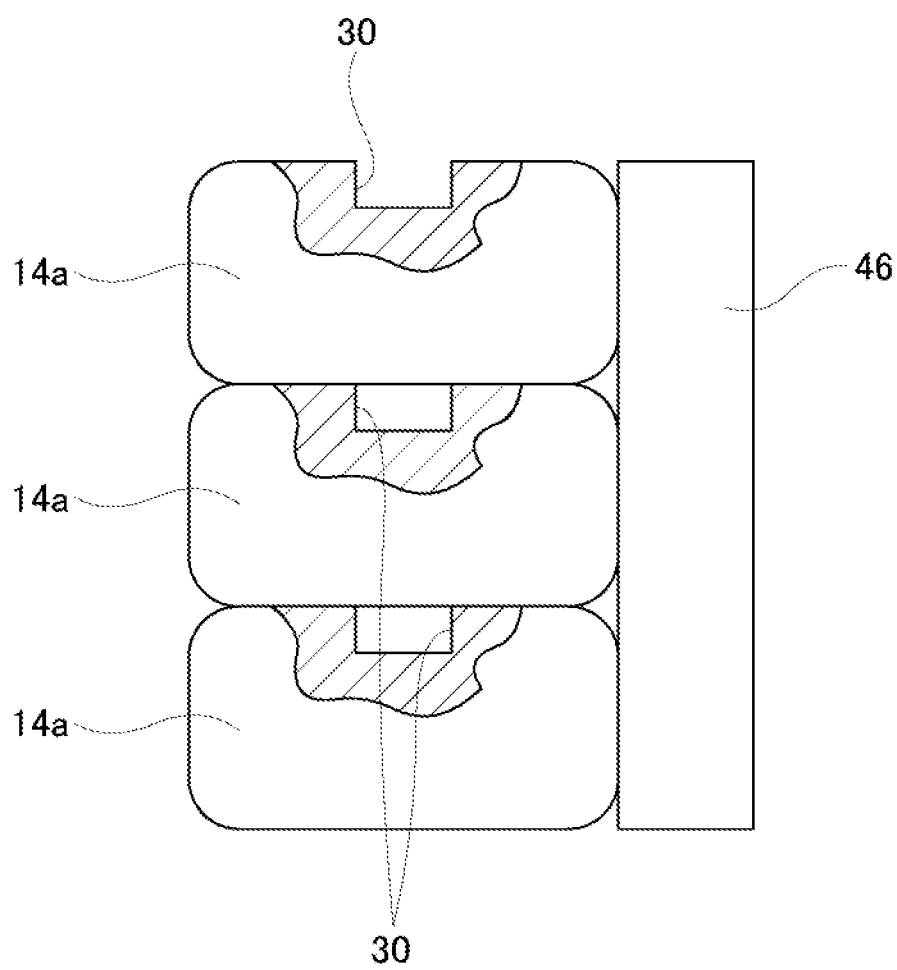
FIG. 6 is a partial cross-sectional enlarged view illustrating a state in which the rolling surfaces of a plurality of rollers of the first example of an embodiment of the present invention are ground.
Figure 18:
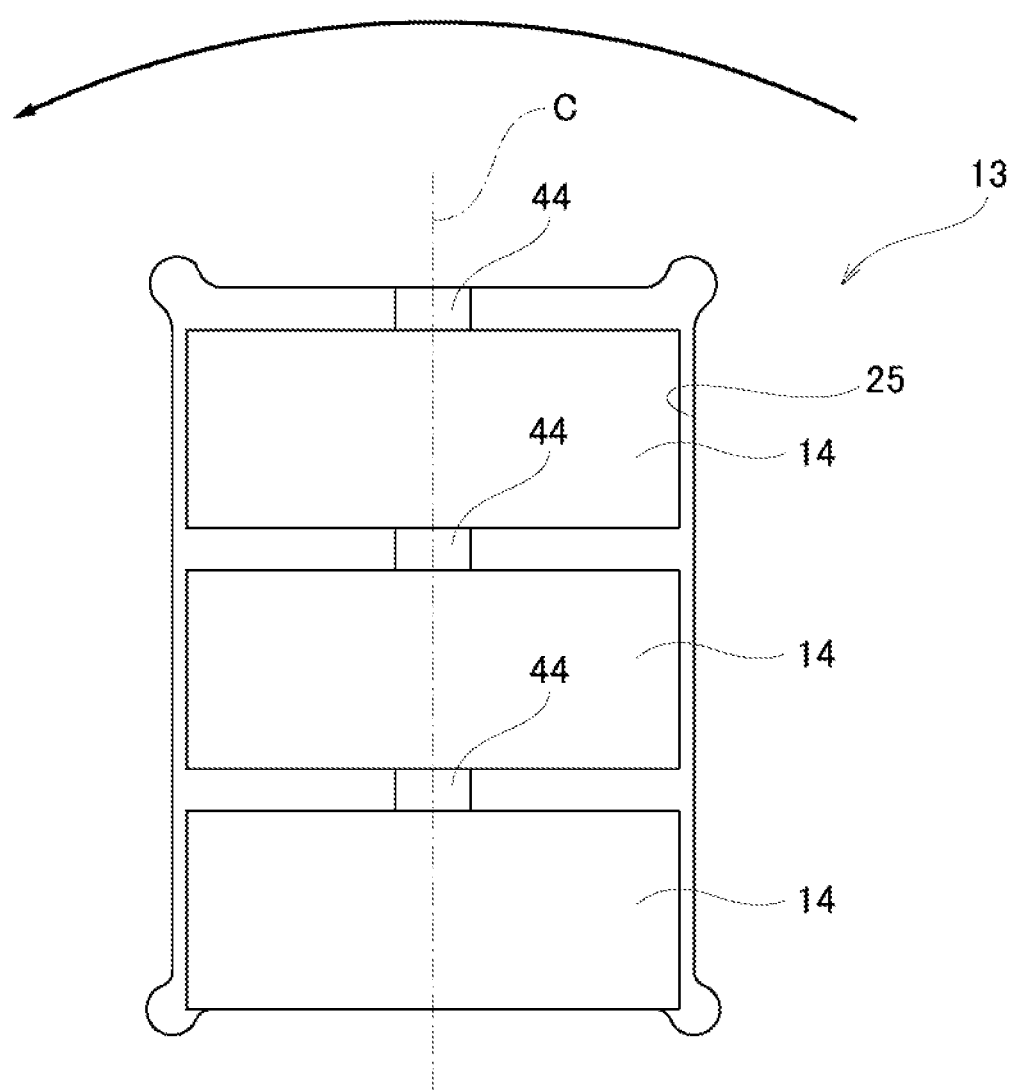
FIG. 18 is a view corresponding to FIG. 4, and illustrates an example of a retainer and rollers of a conventional toroidal continuously variable transmission.

As illustrated in FIG. 6, when performing a finishing process of the rolling surfaces of the rollers, generally, a plurality of rollers are arranged in the axial direction, and a tool 46 such as a grindstone, a shoe or the like is brought into contact with the rolling surfaces of these rollers, and finishing is performed collectively. The roller has an axial dimension that is shorter than the diameter, so when a projecting portion such as the contact portion or the like is integrally provided on an end surface in the axial direction of the roller 14 as in a conventional roller 14 illustrated in FIG. 18, it becomes difficult for the center axes of the rollers 14 to coincide with each other, these rollers 14 are loose, and the processing accuracy of the rolling surfaces thereof is likely to be reduced. On the other hand, in the present example, since the intermediate sliding member 27 is configured so as to be separate from the roller 14a, in the state before the intermediate sliding member 27 is attached, the one end surface in the axial direction of the roller 14a can include a flat surface that extends in a direction orthogonal to the center axis of the roller 14a, and presence of the concave portion 30 does not become an obstacle when stacking a plurality of rollers 14a. Therefore, when performing a finishing process, shifting of the center axes of the plurality of rollers 14a with respect to each other may be effectively prevented, so processing accuracy of the rolling surfaces may be sufficiently ensured.

Second Example

Figure 7:
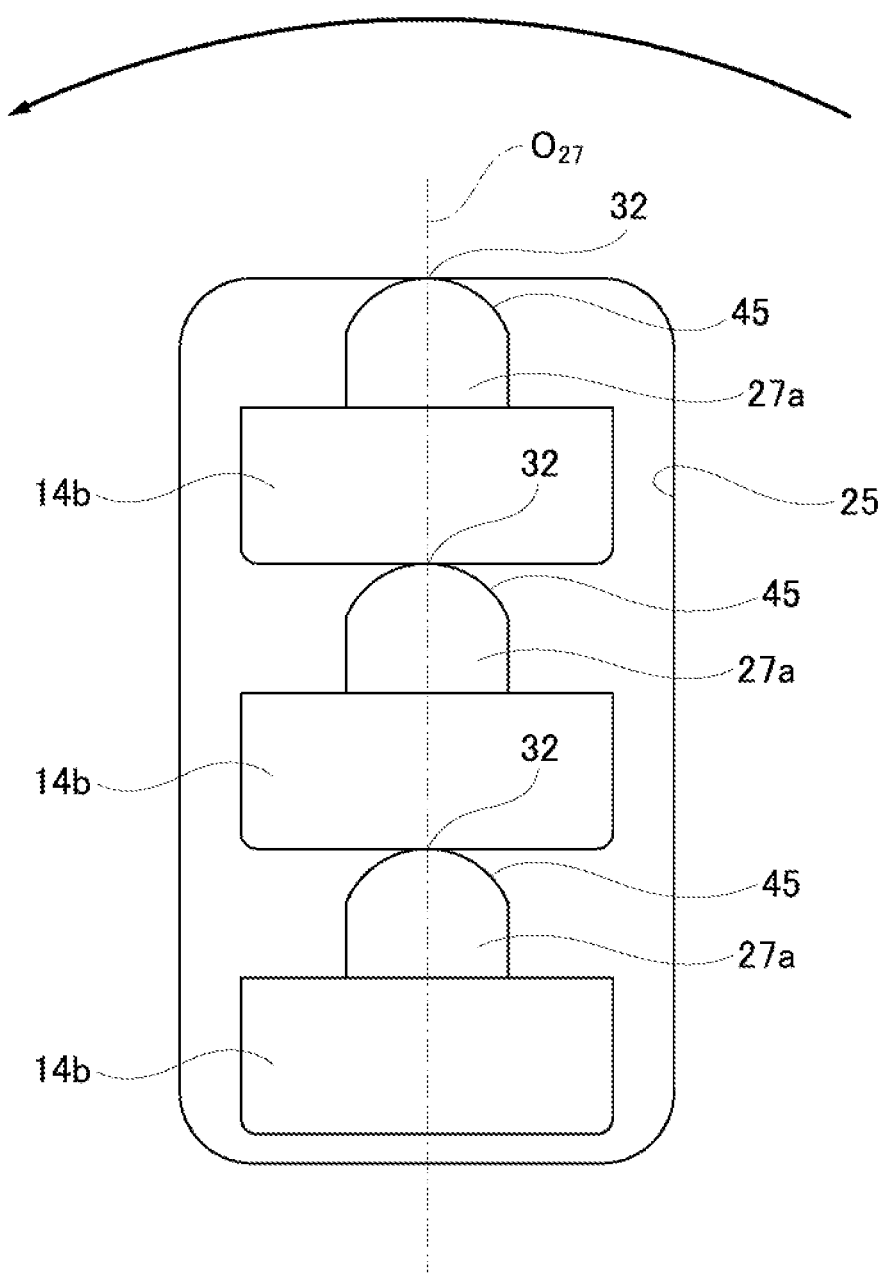
FIG. 7 is a view corresponding to FIG. 4, and illustrates a second example of an embodiment of the present invention.
Figure 8:
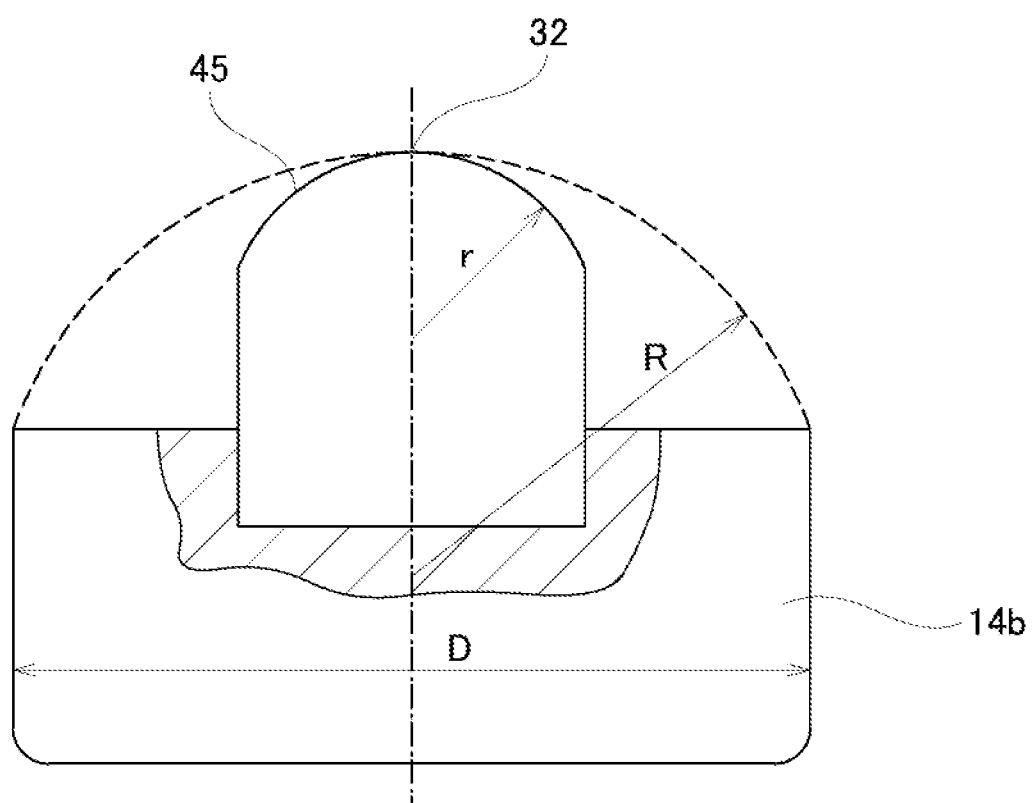
FIG. 8 is a partial enlarged cross-sectional view for comparing the radius of curvature of the tip end surface of an intermediate sliding member of the second example of an embodiment of the present invention with the radius of curvature of a spherical convex portion of a conventional roller.

FIG. 7 and FIG. 8 illustrate a second example of an embodiment of the present invention, which is a modification of the first example of an embodiment. In this example, as in the case of the first example of an embodiment, intermediate sliding members 27a are attached to one end surface in the axial direction (upper end surface in FIG. 7 and FIG. 8) of the respective rollers 14b. However, in this example, the shape of the respective intermediate sliding members 27a is different than in the first example.

The intermediate sliding member 27a has a substantially cylindrical shape on the base side that is attached to one end surface in the axial direction of the roller 14b, however a spherical convex surface 45 is formed on the tip end side. As a result, the intermediate sliding member 27a is such that instead of surface contact with a mating surface, the tip portion thereof can be brought into point contact with the mating surface. Here, in order to reduce hysteresis, or in other words, in order to reduce friction, preferably the value of the radius of curvature of the spherical convex surface 45 is as small as possible. However, as illustrated by the dashed line in FIG. 8, when it is presumed that the spherical convex surface is integrally formed on the one end surface in the axial direction of the roller, the radius of curvature R illustrated by the dotted line is regulated by the diameter D of the roller, and it is difficult to make the radius of curvature R of this spherical convex surface equal to or smaller than one half of the diameter D, which may increase the manufacturing cost.

On the other hand, in the present invention, the intermediate sliding member 27a is separate from the roller 14b, so the spherical convex surface 45 of the intermediate sliding member 27a can be processed first, after which the intermediate sliding member 27a can be attached to the roller 14b, and thus as illustrated by the solid line in FIG. 8, the radius of curvature r of the spherical convex surface 45 is not restricted by the diameter D of the roller 14b. In this way, in the present example, the tip end surface of the intermediate sliding member 27a that comes in sliding contact with the mating surface can be configured by the spherical convex surface 45 having a smaller radius of curvature r, and the effect of reducing hysteresis may be dramatically improved. The other configuration and effectiveness are the same as those of the first example.

Third Example

Figure 9:
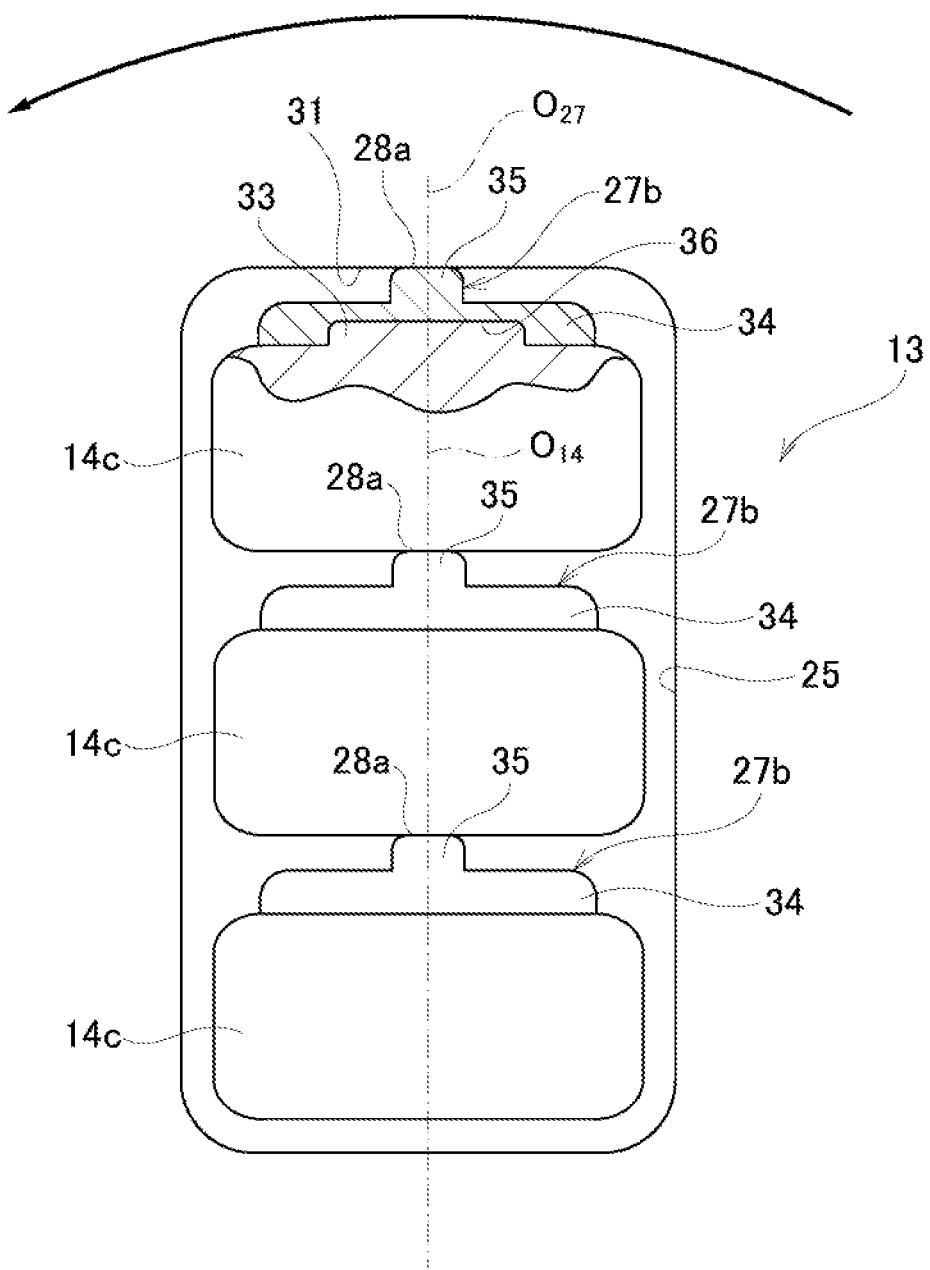
FIG. 9 is a view corresponding to FIG. 4, and illustrates a third example of an embodiment of the present invention.

FIG. 9 illustrates a third example of an embodiment of the present invention, which is a modification of the first example. In this example, as in the first example, an intermediate sliding member 27b is attached to one end surface in the axial direction (upper end surface in FIG. 9) of the roller 14c. However, in this example, the shapes of the roller 14c and the intermediate sliding member 27b, and the manner of attachment of the intermediate sliding member 27b to the roller 14c are different from those in the first example.

The roller 14c has a convex portion 33 that projects in the axial direction at the center portion of one end surface in the axial direction. The tip end surface of the convex portion 33 is a flat surface that extends in a direction orthogonal to the center axis of the roller 14c, or in other words, parallel to the end surface in the axial direction of the roller 14c. The intermediate sliding member 27b includes a disk portion 34 and a cylindrical shaped shaft portion 35 provided at the center portion of one end surface in the axial direction (upper end surface in FIG. 9) of the disk portion 34. The diameter of the shaft portion 35 is the same as the diameter of the intermediate sliding member 27 in the first example of the embodiment. The disk portion 34 has a concave portion 36 that is concave in the axial direction at the center portion of the other end surface in the axial direction (the lower end surface in FIG. 9). In this example, the intermediate sliding member 27b is attached to the roller 14c by inserting the convex portion 33 inside the concave portion 36 so that most of the one end surface in the axial direction of the roller 14c is covered by the disk portion 34.

In this example, even in a case where a moment in the direction of tilting acts on the shaft portion 35 of the intermediate sliding member 27b during operation of the pressing device 11 (refer to FIG. 1 and FIG. 2), this moment can be effectively supported by the one end surface in the axial direction of the roller 14c. Therefore, the center axis $O_{27}$ of the intermediate sliding member 27b and the center axis $O_{14}$ of the roller 14c may be effectively prevented from not coinciding.

In this example as well, the tip end surface of the convex portion 33 provided on the one end surface in the axial direction of the roller 14c is formed so as to be a flat surface, so when performing a finishing process on the rolling surfaces of the rollers 14c, there is no hindrance when arranging the plurality of rollers 14c in the axial direction. Therefore, it is possible to effectively prevent the center axes of the plurality of rollers 14c from shifting with respect to each other at the time of the finishing process, so that the processing accuracy of the rolling surfaces may be sufficiently ensured. The other configuration and effectiveness are the same as those of the first example.

Fourth Example

Figure 10:
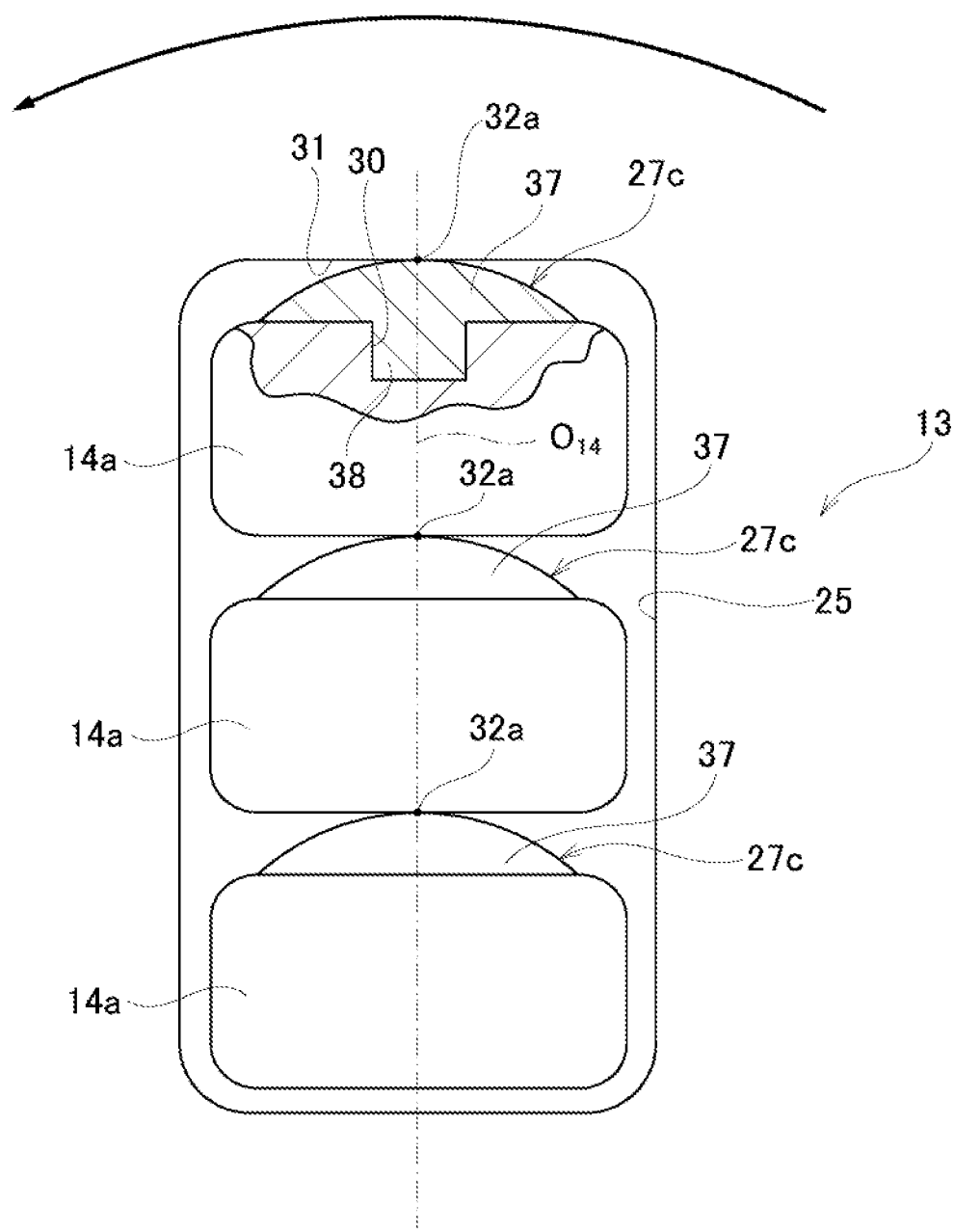
FIG. 10 is a view corresponding to FIG. 4, and illustrates a fourth example of an embodiment of the present invention.

FIG. 10 illustrates a fourth example of an embodiment of the present invention, which is a modification of the first example. In this example as well, as in the first example, a configuration is used in which an intermediate sliding member 27c is attached to one end surface in the axial direction (the upper end surface in FIG. 10) of the roller 14a. However, in this example, the shape of the intermediate sliding members 27c is different than in the first example.

The intermediate sliding member 27c includes a partial spherical portion 37 having one end surface in the axial direction that is a spherical convex surface and the other surface in the axial direction that is a flat surface, and an insert shaft portion 38 that is provided at the center portion of the other surface in the axial direction of the partial spherical portion 37. The insert shaft portion 38 is inserted inside a concave portion 30 that is open to one end surface in the axial direction of a roller 14a. In a state in which the insert shaft portion 38 is inserted in the concave portion 30, the top portion of the spherical convex surface that is a sliding contact surface is positioned at the center axis $O_{14}$ of the roller 14a.

In this example, the sliding contact state between the intermediate sliding member 27c and the inside surface 31 on the outside in the radial direction of the pocket 25 or the other end surface in the axial direction (lower end surface in FIG. 10) of the adjoining roller 14a may be made to be a state of point contact. Therefore, the contact area of the sliding contact portion 32a may be made sufficiently small, and the frictional torque applied to the sliding contact portion 32a may be sufficiently reduced. The other configuration and effectiveness are the same as those of the first example.

Fifth Example

Figure 11:
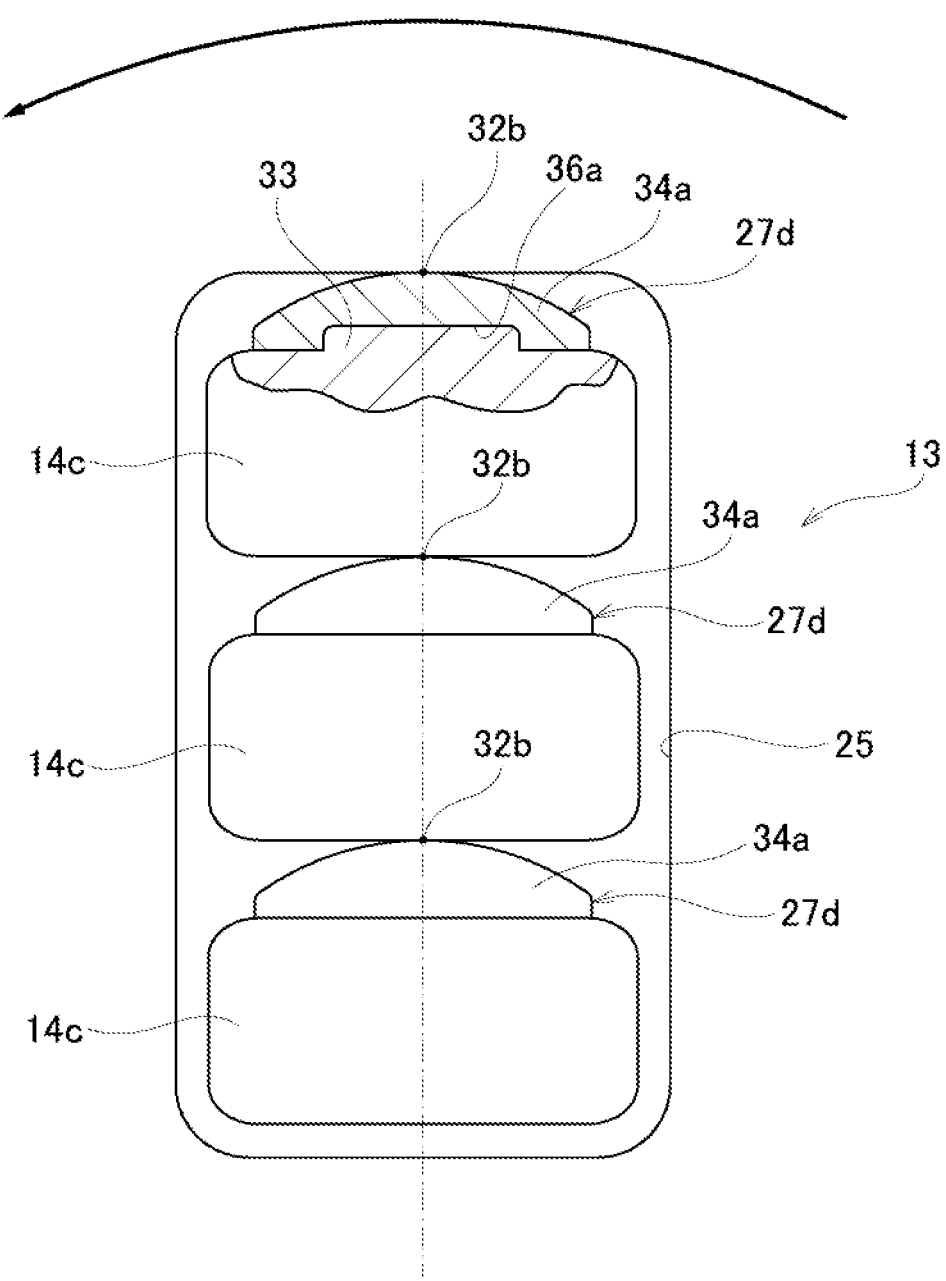
FIG. 11 is a view corresponding to FIG. 4, and illustrates a fifth example of an embodiment of the present invention.

FIG. 11 illustrates a fifth example of an embodiment of the present invention, which is a modification of the third example. In this example, as in the third example, the roller 14c has a convex portion 33 at the center portion of one end surface in the axial direction (upper end surface in FIG. 11)

that projects in the axial direction, and a disk portion 34a of an intermediate sliding member 27d has a concave portion 36a at the center portion of the other end surface in the axial direction into which the convex portion 33 can be inserted. However, in this example, the intermediate sliding member 27d is configured of only the disk portion 34a, and the disk portion 34a has a spherical convex surface as a sliding contact surface on one end surface in the axial direction.

In this example, the contact state between the intermediate sliding member 27d and the inside surface 31 on the outside in the radial direction of the pocket 25 or the other end surface in the axial direction of the adjoining roller 14a may be made to be a state of point contact, so in comparison with the third example of an embodiment, the contact area of the sliding contact portion 32b may be made smaller, the frictional torque applied to the sliding contact portion 32b may be reduced, and it is possible to make it difficult for bending stress to concentrate on the intermediate sliding member 27d. The other configuration and effectiveness are the same as those of the first example through fourth example.

Sixth Example

Figure 12:
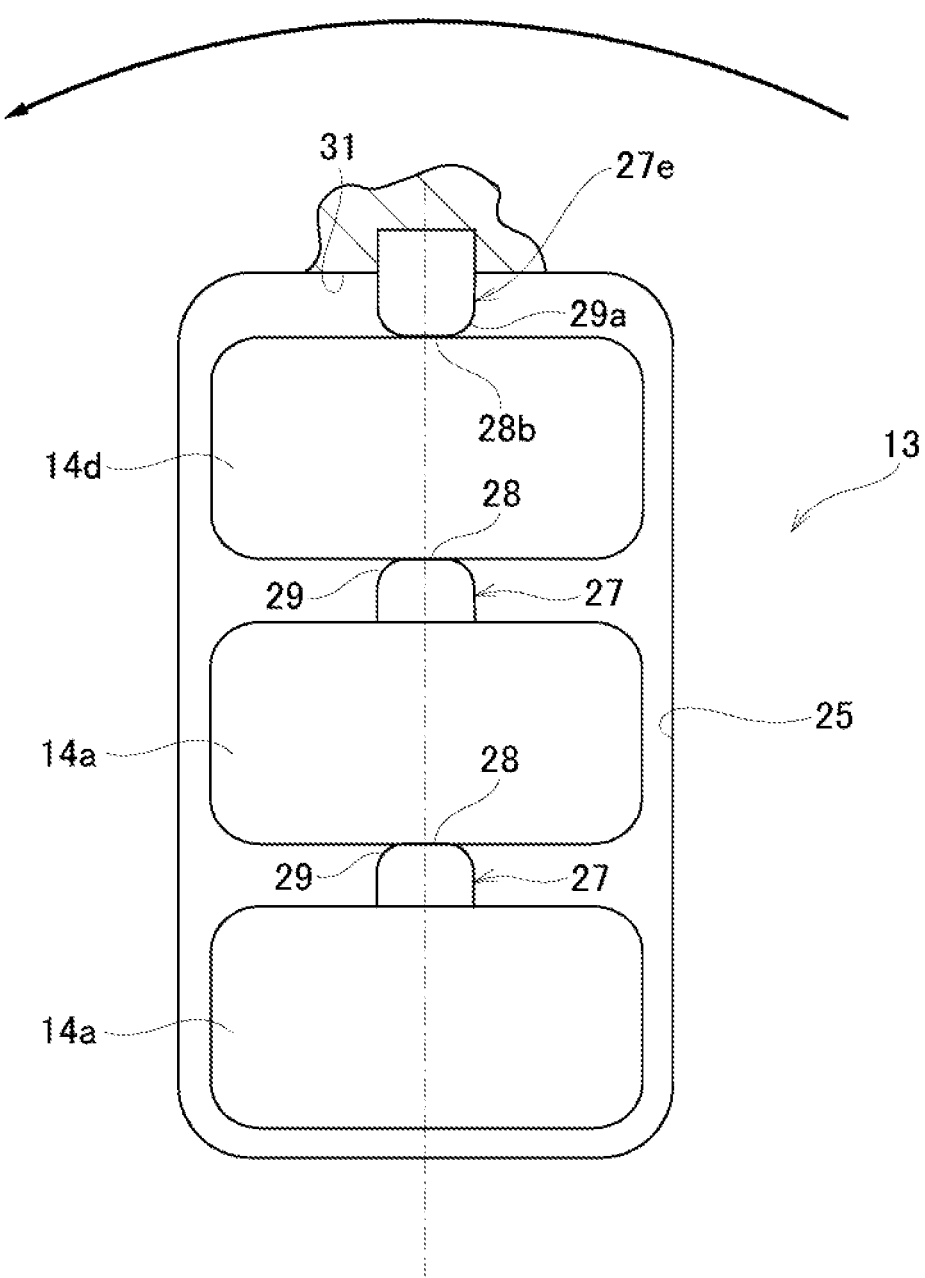
FIG. 12 is a view corresponding to FIG. 4, and illustrates a sixth example of an embodiment of the present invention.

FIG. 12 illustrates a sixth example of an embodiment of the present invention, which is a modification of the first example. In this example, as a roller that is located on the outermost side in the radial direction of the retainer of the plurality of rollers arranged inside the pocket 25, a roller 14d to which an intermediate sliding member is not attached is used instead of the roller 14a, and an intermediate sliding member 27e is attached to the inside surface 31 on the outside in the radial direction of the pocket 25 facing the one end surface in the axial direction (upper end surface in FIG. 12) of this roller 14d.

The intermediate sliding member 27e is formed overall into a cylindrical shape, and one end portion in the axial direction of the intermediate sliding member 27e is fixed to the center portion (portion intersecting the center axis of the pocket 25) in the circumferential direction of the inside surface 31 on the outside in the radial direction of the pocket 25. The intermediate sliding member 27e has a sliding circular contact surface 28b at the center portion of the other end surface in the axial direction, and has a chamfered portion 29a having an arc shaped cross section on the outer circumferential edge portion (outside in the radial direction of the sliding contact surface 28b).

In this example, it is possible to prevent a concave portion from being formed on the inside surface 31 on the outside in the radial direction of the pocket 25 due to friction that occurs when the one end surface in the axial direction of the roller 14d that is located on the outermost side comes in directly sliding contact with the inside surface 31. The target for attaching the intermediate sliding member 27e is the retainer 13 that is large compared with the rollers 14a, 14d, so the work efficiency of the attachment work may be improved.

When implementing this example, the shape and attachment state of the intermediate sliding members 27 that are attached to the rollers 14a other than the roller 14d that is arranged on the outermost side arranged inside the pocket 25 are not limited to the same structure as that of the first example as illustrated in the figure, and other structures such as those of the second to fourth examples or the like may also be used. The intermediate sliding member 27e that is arranged between the inside surface 31 on the outside in the radial direction of the pocket 25 and the one end surface in the axial direction of the roller 14d arranged on the outermost side may be integrally provided with the inside surface 31 on the outside in the radial direction of the pocket 25. In this case, the number of parts may be reduced, and the number of assembly work steps may be reduced. The other configuration and effectiveness are the same as those of the first example.

Seventh Example

Figure 13:
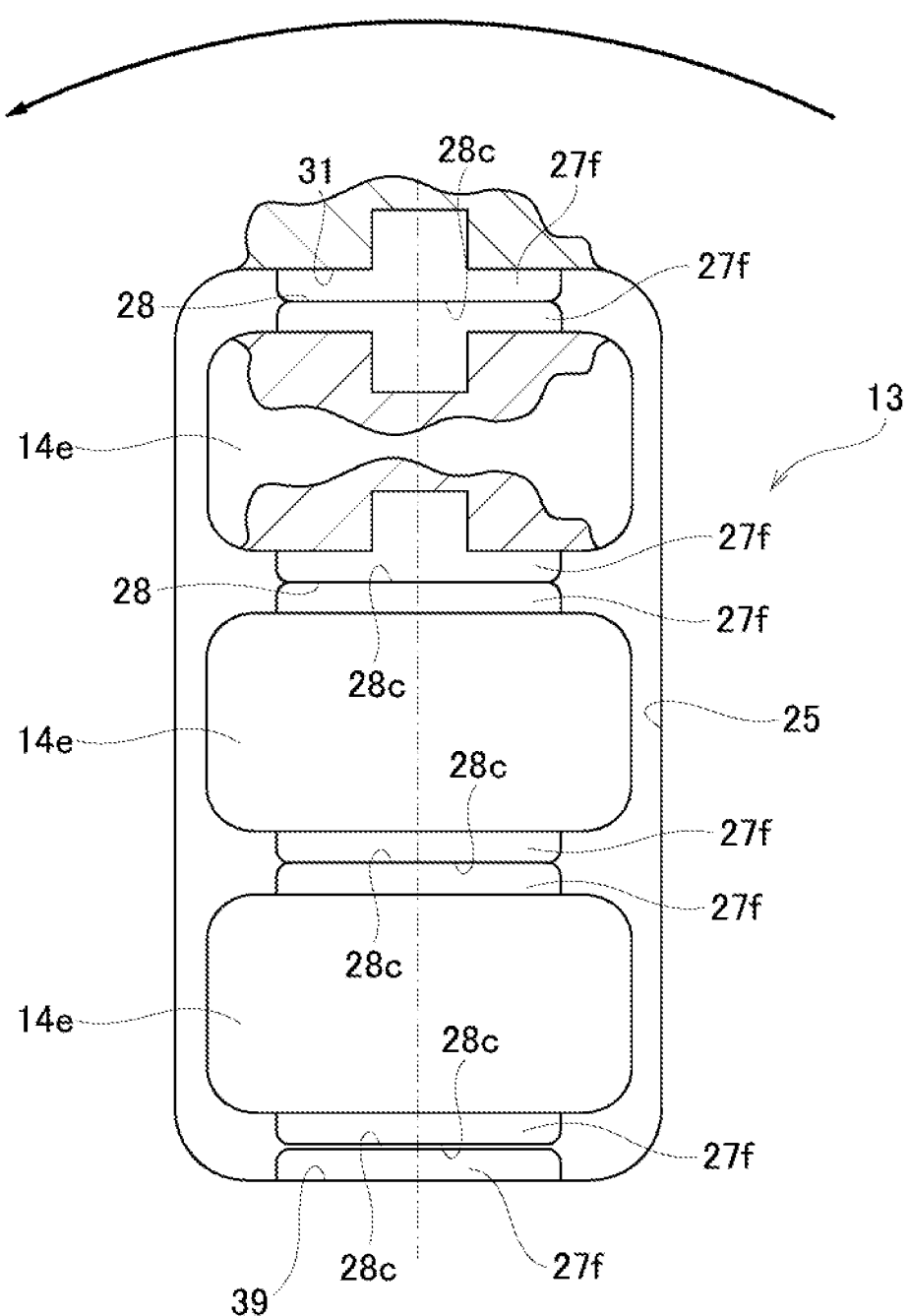
FIG. 13 is a view corresponding to FIG. 4, and illustrates a seventh example of an embodiment of the present invention.

FIG. 13 illustrates a seventh example of an embodiment of the present invention. In this example, an intermediate sliding member 27f is attached not only to the one end surface in the axial direction (upper end surface in FIG. 13) of the roller 14e but also to the other end surface in the axial direction (lower end surface in FIG. 13). Furthermore, an intermediate sliding member 27f is attached not only to the inside surface 31 of the pocket 25 on the outside in the radial direction facing inward in the radial direction, but also to the inside surface 39 of the pocket 25 on the inside in the radial direction facing outward in the radial direction. In this example, the sliding contact surface 28c of the respective intermediate sliding members 27 has the same dimension. In the example, the intermediate sliding member 27f is used of which the diameter is larger and the dimension in the axial direction is smaller in comparison with that of the structure illustrated in the first and sixth examples, however, the same intermediate sliding member as that in the first and sixth examples may be used.

In this example, a pair of intermediate sliding members 27f is arranged in a portion between end surfaces in the axial direction of the respective adjoining rollers 14e that are arranged inside the pocket 25 in a state so as to be mutually facing the respective sliding contact surfaces 28c. In addition, a pair of intermediate sliding members 27f is arranged in a portion between the inside surface 31 on the outside in the radial direction of the pocket 25 and one end surface in the axial direction of the roller 14e arranged on the outermost side in the radial direction of the retainer 13, and in a portion between the inside surface 39 on the inside in the radial direction of the pocket 25 and the other end surface in the axial direction of the roller 14e arranged on the innermost side in the radial direction of the retainer 13 in a state so as to be mutually facing the respective sliding contact surfaces 28c.

In this example, it is possible to prevent formation of recesses caused by wear due to sliding contact on both end surfaces in the axial direction of the respective rollers 14e and the inner surface 31 on the outside in the radial direction and the inside surface 39 on the inside in the radial direction of the pocket 25. Moreover, in this example, the diameter of the intermediate sliding members 27f (sliding contact surfaces 28c) is large, however, by using a material for the intermediate sliding members 27f such as aluminum, brass or the like that has a lower hardness than the material of the rollers 14e, the effect of reducing hysteresis is sufficiently obtained in comparison with a case where there is direct sliding contact between the rollers. The other configuration and operational effects are the same as those of the first example and sixth example.

Eighth Example

Figure 14:
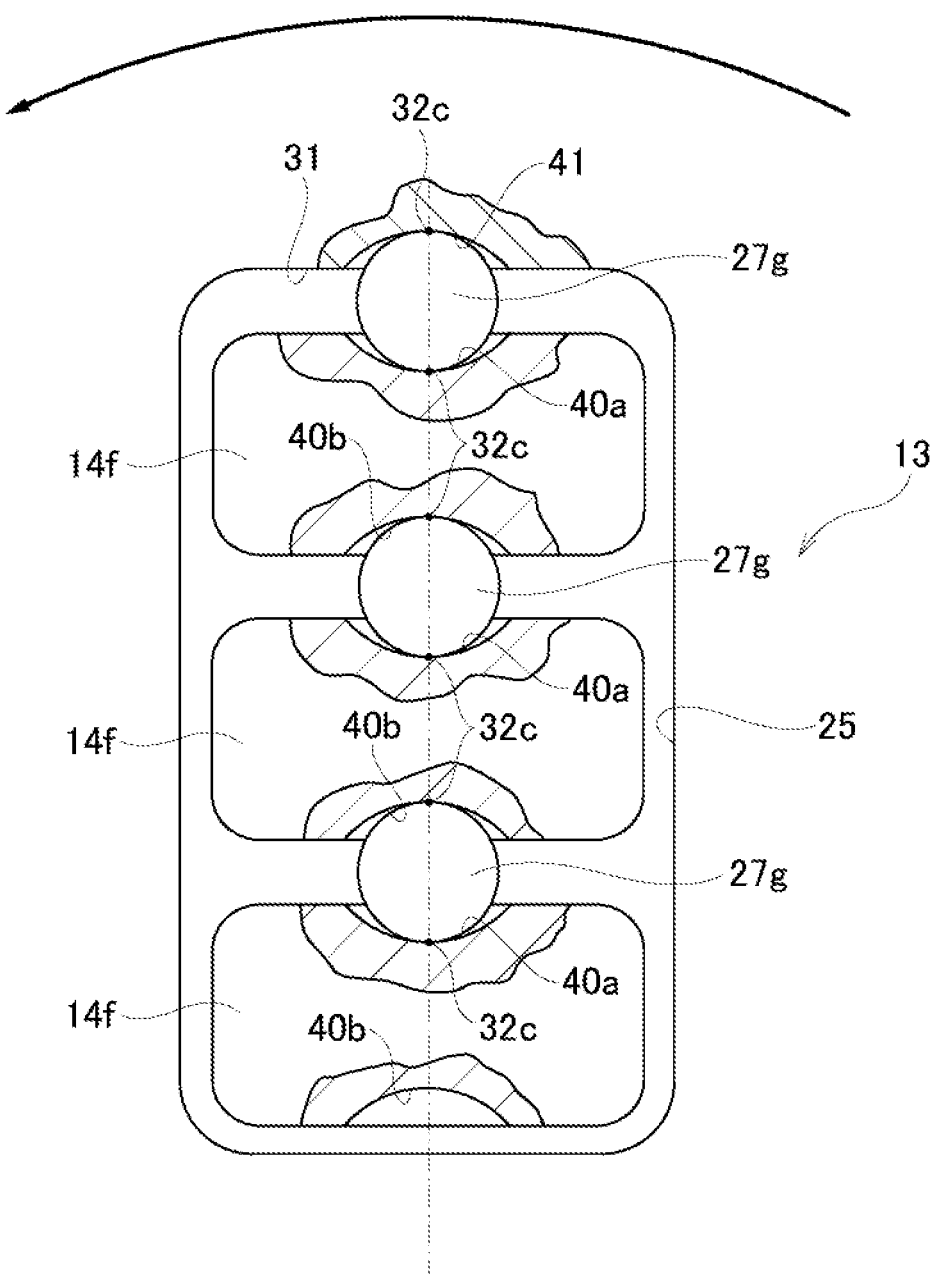
FIG. 14 is a view corresponding to FIG. 4, and illustrates an eighth example of an embodiment of the present invention.

FIG. 14 illustrates an eighth example of an embodiment of the present invention. In this example, an intermediate sliding member 27g, which is a ball (sphere), is arranged in a portion between end surfaces in the axial direction of the respective adjoining rollers 14f that are arranged inside the pocket 25, and in a portion between the inside surface 31 on the outside in the radial direction of the pocket 25 and one end surface in the axial direction (upper end surface in FIG. 14) of the roller 14f that is located on the outermost side in the radial direction of the retainer 13.

The rollers 14f have partial spherical shaped concave portions 40a, 40b having an arc shaped cross section that are located at the center portions of both end surfaces in the axial direction, and each is recessed in the axial direction. The concave portions 40a, 40b have a radius of curvature that is larger than the radius of curvature of the intermediate sliding members (balls) 27e. The pocket 25 has a partial spherical shaped concave portion 41 having an arc shaped cross section that is located in the center portion in the circumferential direction of the inside surface 31 on the outside in the radial direction, and is recessed outward in the radial direction. The concave portion 41 has a radius of curvature that is the same as the radius of curvature of the concave portions 40a, 40b.

In this example, the intermediate sliding members 27g respectively come in sliding contact in point contact with the inside surface of the concave portion 41 and the inside surface of the concave portion 40a that are arranged on both sides in the radial direction of the retainer 13 so as to sandwich the intermediate sliding member 27g, and with the inside surface of the concave portions 40b and the inside surfaces of the concave portions 40a of the respective adjoining rollers 14f arranged to sandwich the intermediate sliding member 27g in the radial direction of the retainer 13. Therefore, the contact areas of the sliding contact portions 32c may be made sufficiently small, and the frictional torque applied to the sliding contact portions 32 may be sufficiently reduced. The other configuration and operational effects are the same as those of the first example.

Ninth Example

Figure 15:
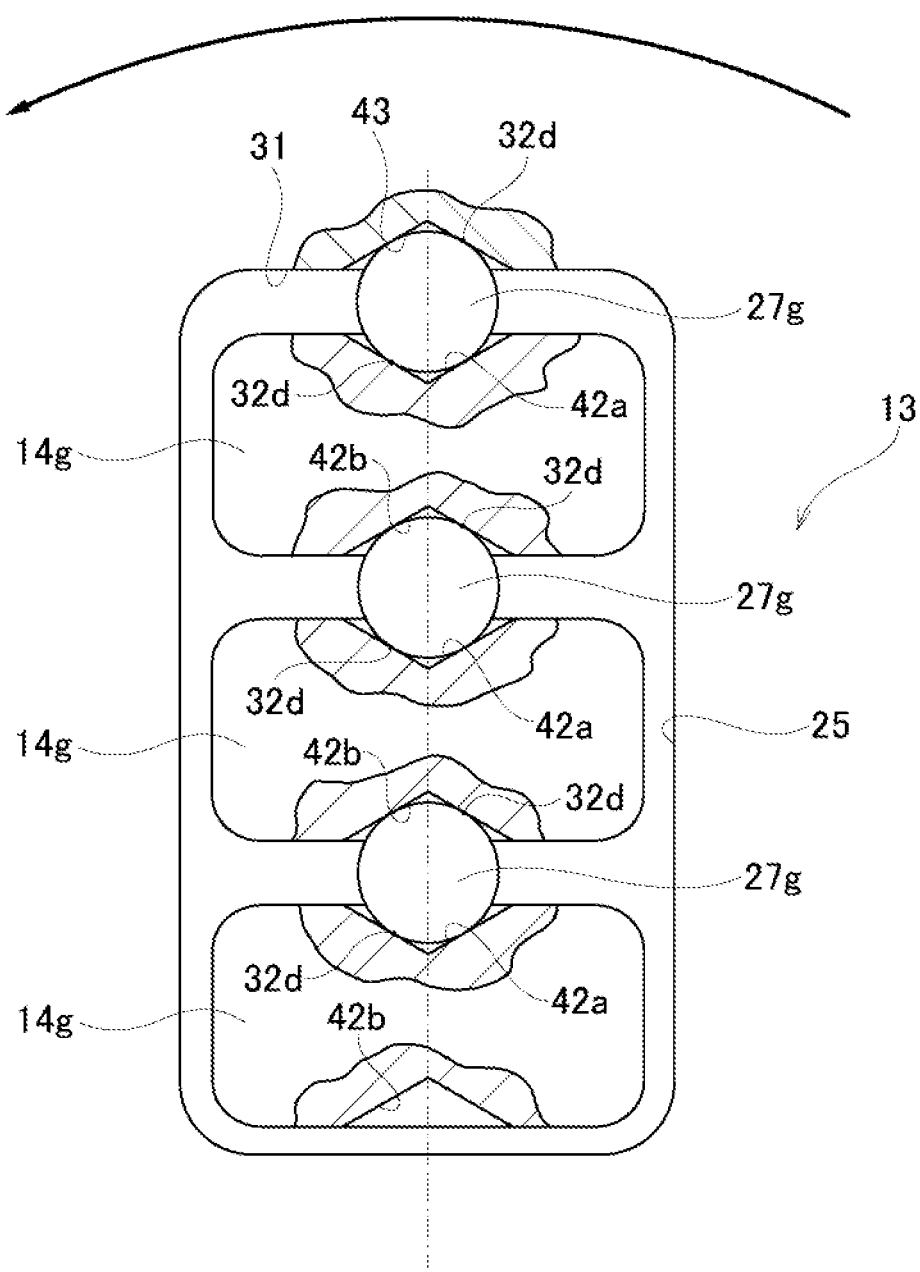
FIG. 15 is a view corresponding to FIG. 4, and illustrates a ninth example of an embodiment of the present invention.

FIG. 15 illustrates a ninth example of an embodiment of the present invention, which is a modification of the eighth example. In this example, as in the eighth example, a configuration is adopted in which intermediate sliding members 27g, which are balls, are respectively arranged in the portions between end surfaces in the axial direction of the adjoining rollers 14g that are arranged inside the pocket 25, and in the portion between the inside surface 31 on the outside in the radial direction of the pocket 25 and one end surface (upper end surface in FIG. 15) in the axial direction of the roller 14g that is located on the outermost side in the radial direction of the retainer 13. However, in this example, conical concave portions 42a, 42b, 43 that come in sliding contact with the intermediate sliding members 27g and each have a triangular cross section are formed in both end surfaces in the axial direction of the rollers 14g and in the inside surface 31 on the outside in the radial direction of the pocket 25.

In this example, the sliding contact state between the intermediate sliding members 27g and the concave portions 42a, 42b, and 43 can be made to be line contact, respectively, so the contact areas of the sliding contact portions 32d may be made sufficiently small. The other configuration and operational effects are the same as those of the first example and eighth example.

Tenth Example

Figure 16:
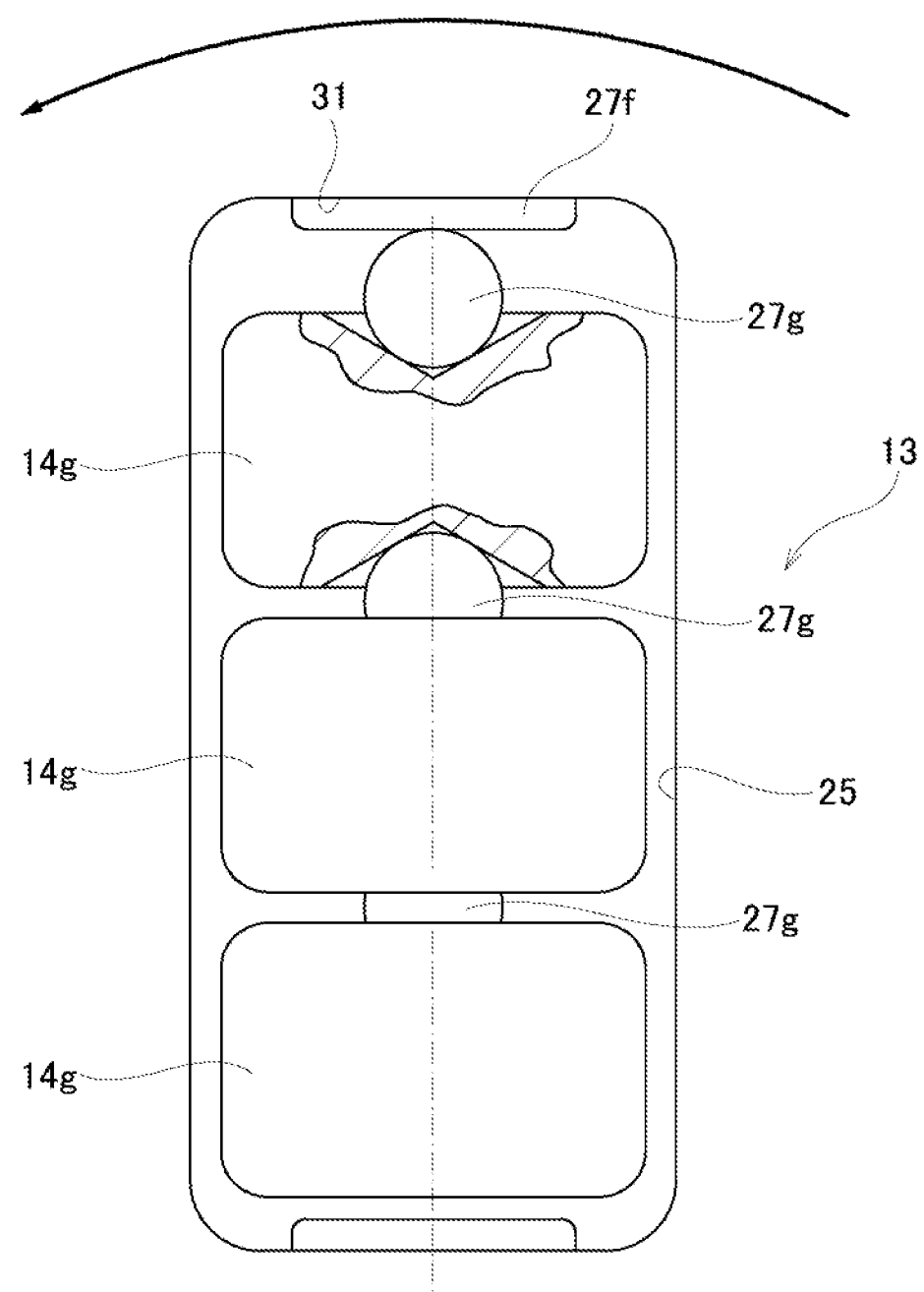
FIG. 16 is a view corresponding to FIG. 4, and illustrates a tenth example of an embodiment of the present invention.
Figure 17:
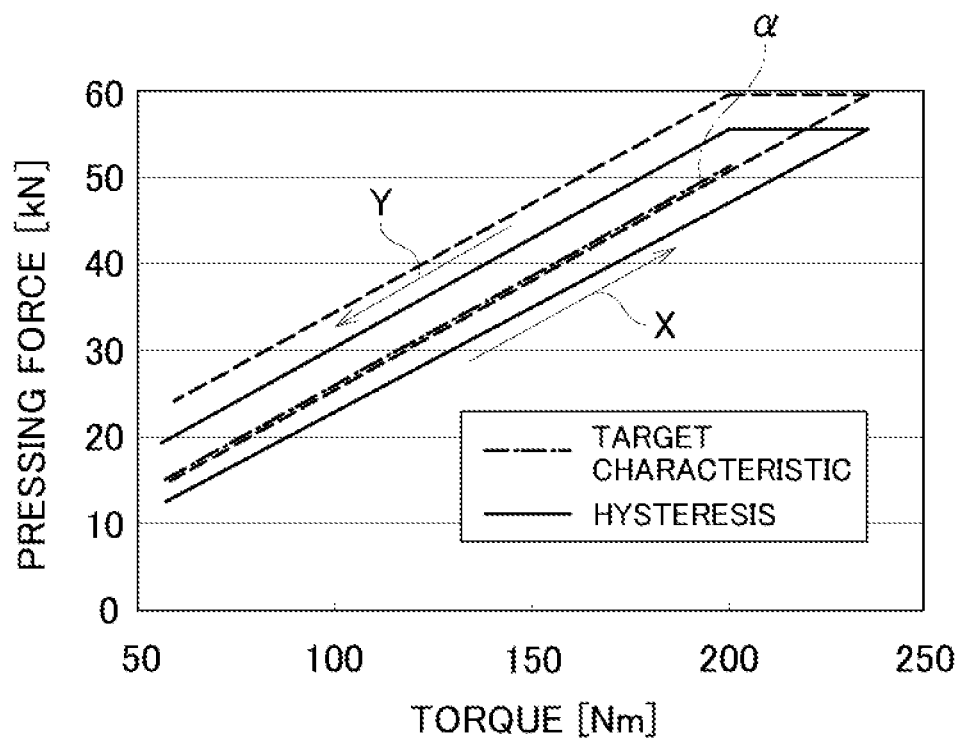
FIG. 17 is an image diagram illustrating the relationship between the pressing force and the torque generated by the loading cam type pressing device.

FIG. 16 illustrates a tenth example of an embodiment of the present invention, which is a modification of the eighth example. In this example, as in the eighth example, a configuration is adopted in which intermediate sliding members 27g, which are balls, are respectively arranged in the portions between end surfaces in the axial direction of the adjoining rollers 14g that are arranged inside the pocket 25, and in the portion between the inside surface 31 on the outside in the radial direction of the pocket 25 and one end surface in the axial direction of the roller 14g that is located on the outermost side in the radial direction of the retainer 13. However, in this example, a cylindrical shaped intermediate sliding member 27f as shown in the seventh example or intermediate sliding member 27e as shown in the sixth example instead of forming a partial spherical concave portion or partial conical shaped concave portion or the like in the inside surface 31 on the outside in the radial direction of the pocket 25.

In this example, it is possible to prevent a recess from being formed on the inside surface 31 on the outside in the radial direction of the pocket 25 caused by friction due to sliding contact. The other configuration and operational effects are the same as those of the first example and eighth example.

INDUSTRIAL APPLICABILITY

In carrying out the present invention, the shape of the intermediate sliding member and the manner of attaching the intermediate sliding member to the respective rollers and the retainer are not limited to the structure of the respective examples described above, and for example, the shape could be changed to a conical shape or a conical trapezoidal shape as appropriate without departing from the spirit and technical idea of the present invention. The structures of the examples of the embodiments can be combined as appropriate as long as they do not contradict each other.

REFERENCE SIGNS LIST

1 Toroidal continuously variable transmission
2 Input shaft
3 Ball spline
4a, 4b Outside disk
5 Gear
6a, 6b Inside disk
7 Power roller
8 Trunnion
9 Support shaft
10 Drive shaft
11 Pressing device
12 Cam plate
13 Retainer
14, 14a to 14g Roller
15 Annular portion
16 Cylindrical portion
17 Drive-side cam surface
18 Protruding piece
19 Outer-ring raceway
20 Ball bearing
21 Inner-ring raceway
22 Ball
23 Oil hole
24 Driven-side cam surface
25 Pocket
26a, 26b Protruding portion
27, 27a to 27g Intermediate sliding member
28, 28a, 28b, 28c Sliding contact surface
29, 29a Chamfered portion 30 Concave portion
31 Inside surface on the outside in the radial direction
32, 32a to 32d Sliding contact portion
33 Convex portion
34, 34a Disk portion
35 Shaft portion
36, 36a Concave portion
37 Partial spherical portion
38 Insert shaft portion
39 Inside surface on the inside in the radial direction
40a, 40b Concave portion
41 Concave portion
42a, 42b Concave portion
43 Concave portion
44 Contact portion
45 Spherical convex surface
46 Tool

The invention claimed is:

1. A pressing device for a toroidal continuously variable transmission, comprising:
a cam plate having a first cam surface that is uneven in a circumferential direction on one side in an axial direction;
a disk having a toroidal curved surface with arc-shaped cross section on one side in the axial direction, and a second cam surface that is uneven in the circumferential direction on the other side in the axial direction and faces the first cam surface;
a retainer arranged between the first cam surface and the second cam surface and having rectangular shaped pockets arranged at a plurality of locations in the circumferential direction so that a center axis of the respective pockets is arranged in a radial direction; and
a plurality of rollers rotatably held inside the pockets with two or more rollers of the plurality of rollers arranged in a row in the radial direction of the retainer inside the respective pockets;
wherein
an intermediate sliding member provided separately from the respective rollers is arranged coaxially with the center axis of the respective rollers in at least one location of a portion between an end surface on an outside in the radial direction of the retainer of one roller of the two or more rollers arranged in the respective pockets that is located on an outermost side in the radial direction of the retainer and an inside surface of the respective pockets on the outside in the radial direction of the retainer, and a portion between an end surface on the outside in the radial direction of the retainer of one roller of adjoining rollers in the radial direction of the retainer of the two or more rollers and an end surface on an inside in the radial direction of the retainer of the other roller of the adjoining rollers;
sliding contact occurs between the intermediate sliding member and the inside surface of the respective pockets on the outside in the radial direction of the retainer, between the intermediate sliding member and the end surface on the outside in the radial direction of the retainer of the one roller located on the outermost side or the one roller of the adjoining rollers, between the intermediate sliding member and an end surface on the inside in the radial direction of the other roller, or a separate intermediate sliding member that is attached to each of the above surfaces; and
a contact area of a sliding contact portion between the intermediate sliding member and the above surfaces or the separate intermediate sliding member is smaller than a contact area of a sliding contact portion in a case where the intermediate sliding member is not provided and there is direct sliding contact between the end surface on the outside in the radial direction of the retainer of the one roller located on the outermost side and the inside surface on the outside in the radial direction of the retainer of the respective pockets, or between the end surface on the outside in the radial direction of the retainer of the one roller of the adjacent rollers and the end surface on the inside in the radial direction of the retainer of the other roller.

2. The pressing device for a toroidal continuously variable transmission according to claim 1, wherein the intermediate sliding member is attached to the end surface on the outside in the radial direction of the retainer of either of the rollers.

3. The pressing device for a toroidal continuously variable transmission according to claim 2, wherein
the intermediate sliding member is attached to the end surface on the outside in the radial direction of the retainer of all the respective rollers, the intermediate sliding member is arranged coaxially with the center axis of the respective rollers in all locations of the portion between the end surface on the outside in the radial direction of the retainer of the one roller located on the outermost side in the radial direction of the retainer and the inside surface of the respective pockets on the outside in the radial direction of the retainer, and the portion between the end surface on the outside in the radial direction of the retainer of the one roller of the adjoining rollers and the end surface on the inside in the radial direction of the retainer of the other roller of the adjoining rollers.

4. The pressing device for a toroidal continuously variable transmission according to claim 1, wherein
the intermediate sliding member has a tip end surface that comes in contact with the sliding contact portion, the tip end surface being configured with a spherical convex surface or a conical convex surface.

5. The pressing device for a toroidal continuously variable transmission according to claim 1, wherein
a partial spherical or conical concave portion is provided in a portion that comes in sliding contact with the intermediate sliding member of the end surface of the respective rollers and/or the inside surfaces of the respective pockets of the retainer.

6. The pressing device for a toroidal continuously variable transmission according to claim 1, wherein
at least the end surface on the outside in the radial direction of the retainer of the respective rollers comprises an R portion that connects the end surface with a rolling surface of the respective rollers, and an attaching portion provided in a center portion in the radial direction of the end surface for attaching the intermediate sliding member; wherein a surface that constitutes the end surface that is located on an outermost side in the radial direction of the retainer of the end surface is constructed by a flat surface that extends in a direction orthogonal to the center axis of the respective rollers.

7. The pressing device for toroidal continuously variable transmission according to claim 6, wherein
the attaching portion is configured by a concave portion that is provided on the end surface and the end surface corresponds to the surface located on the outermost side.

8. The pressing device for toroidal continuously variable transmission according to claim 6, wherein
the attaching portion is configured by a convex portion provided on the end surface, and the surface located on the outermost side is constructed by a tip end surface of the convex portion.

9. The pressing device for toroidal continuously variable transmission according to claim 1, wherein
the intermediate sliding member is made of material having hardness that is lower than hardness of a material constituting the respective rollers.

* * * * *